United States Patent
Abramson et al.

(10) Patent No.: US 11,297,458 B1
(45) Date of Patent: Apr. 5, 2022

(54) ADAPTIVE DASHBOARD, WAYFINDING, AND OTHER SERVICES AT VENUES USING SHORT-RANGE WIRELESS COMMUNICATIONS

(71) Applicant: MLB Advanced Media, L.P., New York, NY (US)

(72) Inventors: Marc Abramson, New York, NY (US); Chad Evans, New York, NY (US); Eric O'Brien, New York, NY (US); Adam Ritter, New York, NY (US); Joe Inzerillo, New York, NY (US); Bob Bowman, New York, NY (US)

(73) Assignee: MLB ADVANCED MEDIA, L.P., New York, NY (US)

( * ) Notice: Subject to any disclaimer, the term of this patent is extended or adjusted under 35 U.S.C. 154(b) by 0 days.

(21) Appl. No.: 15/654,964

(22) Filed: Jul. 20, 2017

Related U.S. Application Data

(63) Continuation of application No. 14/497,979, filed on Sep. 26, 2014.

(60) Provisional application No. 61/882,966, filed on Sep. 26, 2013.

(51) Int. Cl.
- *H04B 7/00* (2006.01)
- *H04W 4/02* (2018.01)
- *H04W 4/80* (2018.01)

(52) U.S. Cl.
CPC ............... *H04W 4/02* (2013.01); *H04W 4/80* (2018.02)

(58) Field of Classification Search
CPC .................................. H04W 4/02; H04W 4/80
USPC ......................................................... 455/41.2
See application file for complete search history.

(56) References Cited

U.S. PATENT DOCUMENTS

| | | | | |
|---|---|---|---|---|
| 7,649,873 | B2 * | 1/2010 | Bonta | H04W 48/10 370/338 |
| 8,738,024 | B1 * | 5/2014 | Kerr | G06Q 30/0233 455/456.5 |
| 9,060,282 | B2 | 6/2015 | Kosseifi et al. | |
| 9,063,212 | B2 * | 6/2015 | Jones, Jr. | G01S 1/68 |
| 9,215,570 | B2 * | 12/2015 | Schulz | H04W 4/023 |
| 2003/0146835 | A1 * | 8/2003 | Carter | G01S 5/0252 340/539.13 |

(Continued)

FOREIGN PATENT DOCUMENTS

WO    WO-2014/152618 A2    9/2014

*Primary Examiner* — April G Gonzales
(74) *Attorney, Agent, or Firm* — Foley & Lardner LLP

(57) ABSTRACT

Systems and method are provided for adaptive dashboards, wayfinding, and other services at an event venue. The systems and methods involve transmitting beacon messages using short-range wireless communications from a plurality of beacon devices provided at the event venue, wherein each beacon message comprises location identification information. The systems and method further involve processing using a module on a mobile electronic device beacon messages received by the mobile electronic device by comparing beacon identification information included as part of the beacon messages to beacon information stored on the mobile electronic device. The system and methods further involve displaying an adaptive dashboard, wayfinding information, or other event venue information to a user of the mobile electronic device based on the processing of beacon messages received by the mobile electronic device.

20 Claims, 18 Drawing Sheets

(56) References Cited

U.S. PATENT DOCUMENTS

| | | | | |
|---|---|---|---|---|
| 2007/0086426 A1* | 4/2007 | Bonta | .................... | H04W 48/10 |
| | | | | 370/350 |
| 2012/0302261 A1* | 11/2012 | Tinnakornsrisuphap | .................... | |
| | | | | G01S 5/0252 |
| | | | | 455/456.4 |
| 2013/0065584 A1* | 3/2013 | Lyon | .................... | H04W 28/06 |
| | | | | 455/434 |
| 2013/0260693 A1* | 10/2013 | Un | .................... | H04W 64/00 |
| | | | | 455/67.11 |
| 2015/0177006 A1 | 6/2015 | Schulz et al. | | |
| 2015/0382144 A1* | 12/2015 | Lopez | .................... | H04W 4/023 |
| | | | | 455/456.2 |

* cited by examiner

| Beacon ID | Location Name | Location |
|---|---|---|
| 150 | Seating Section 104 | < 9 , 5 > |
| 152 | Seating Section 106 | < 11 , 5 > |
| 154 | Seating Section 108 | < 8 , 6 > |
| 156 | Seating Section 110 | < 13 , 6 > |
| 158 | Seating Section 112 | < 9 , 7 > |
| 160 | Seating Section 114 | < 11 , 7 > |
| 162 | West Entry Gate | < 5 , 6 > |
| 164 | East Entry Gate | < 10 , 3 > |
| 166 | North Entry Gate | < 13 , 6 > |
| 168 | South Entry Gate | < 10 , 9 > |
| 170 | Northeast Restrooms | < 13 , 4 > |
| 172 | Southeast Concession Stand | < 13 , 7 > |
| 174 | Southwest Restrooms | < 8 , 8 > |
| 176 | Northwest Store | < 7 , 5 > |
| 178 | Team Statue Garden | < 6 , 3 > |

Figure 4A

| Beacon ID | Location Name | Location |
|---|---|---|
| 180 | Train Station | < 14 , 1 > |
| 182 | Southeast Pedestrian Access | < 15 , 11 > |
| 184 | North Parking | < 3 , 3 > |
| 186 | Central Parking | < 3 , 6 > |
| 188 | South Parking | < 3 , 10 > |

ADAPTIVE DASHBOARD, WAYFINDING, AND OTHER SERVICES AT VENUES USING SHORT-RANGE WIRELESS COMMUNICATIONS

CROSS REFERENCE TO RELATED APPLICATIONS

This application is a continuation of U.S. application Ser. No. 14/497,979, filed Sep. 26, 2014; which claims the benefit of and priority to U.S. Provisional Application No. 61/882,966, filed Sep. 26, 2013, the contents of which are herein incorporated by reference in their entirety.

BACKGROUND

Field

The present disclosure relates generally to communication systems and processes and more particularly to providing adaptive dashboards, wayfinding, and other services at event venues using short-range wireless communications.

Background

The present invention relates to fields for providing information and tools to users through mobile devices based on geographic or other location of the user. Various techniques are known for detecting the location of a user based on technologies such as Global Positioning System, cellular tower signal triangulation, and others. Bluetooth Low Energy ("BLE") is technology for providing low-power transmitters transmitting a signal to a small area. These transmitters can include nodes capable of establishing a connection with other Bluetooth devices within their range, thereby creating a personal area network ("PAN"). These transmitters can also include nodes capable of only one-way transmission, i.e., for sending signals that will be received by other Bluetooth enabled devices.

At a modern event site, a guest visiting the site may be provided with various elements of information in order to assist the guest in navigating throughout the event site. The primary form of information is the use of printed signs displayed throughout the event site. These signs may inform the user of a present location, such as "Blue Parking" or "Section 100." These signs may inform the user of directions to travel in order to arrive at other locations, such as a sign with left and right arrows for various seating sections at a ballpark. In addition, guests may receive a rendering of a map of the event site with some locations indicated. This may be provided in a printed program for the event, for instance. Other forms of information may be used in order to help guests navigate event sites.

SUMMARY

Embodiments of the present invention relate to systems and methods for providing, adaptive dashboards, wayfinding, and other services at event venues using short-range wireless communications.

According to an embodiment of the present invention, a system is provided for wayfinding at an event venue. The system includes a plurality of beacon devices provided at the event venue, wherein each beacon device of the plurality of beacon devices is configured to transmit beacon identification information as part of a beacon message using short-range wireless communications; and an event module provided on a mobile electronic device, wherein the event module is configured to process beacon messages received by the mobile electronic device in order to display event venue information to a user of the mobile electronic device. The system is provided so that wherein the event module is configured to process the beacon messages received by the mobile electronic device by comparing beacon identification information included as part of the beacon messages to beacon information stored on the mobile electronic device.

In some embodiments, the system is provided so that the short range wireless communications comprises a personal area network communications technology.

In some embodiments, the system is provided so that the short-range wireless communications comprises Bluetooth Low Energy ("BLE") communications.

In some embodiments, the system further includes a server configured to transmit the beacon information to the mobile electronic device.

In some embodiments, the system is provided so that the server is configured to transmit the beacon information to the mobile electronic device prior to the mobile electronic device being present at the event venue.

In some embodiments, the system is provided so that the server is configured to transmit the beacon information to the mobile electronic device based on a determination that the mobile electronic device is likely to be present at the event venue in the future.

In some embodiments, the system is provided so that each beacon device of the plurality of beacon devices is provided at one of the following locations: an entry point for the event venue; a parking facility for the event venue; a sales site at the event venue; a seating area at the event venue; a point of interest at the event venue; a guest facilities site at the event venue; and a navigation site at the event venue.

In some embodiments, the system is provided so that the event venue information comprises direction information that indicates a route to travel in order to arrive at a predefined destination for the user.

In some embodiments, the system is provided so that the event module is configured to define the predefined destination based on an electronic ticket stored on the mobile electronic device.

In some embodiments, the system is provided so that the event module is configured to record a location where the mobile electronic device has been located based at least on beacon identification information included as part of at least one beacon message received by the mobile electronic device and the beacon information stored on the mobile electronic device, and so that the event venue information comprises direction information that indicates a route to travel from a present location of the mobile electronic device in order to arrive at the recorded location where the mobile electronic device has been located.

According to some embodiments, a method for wayfinding at an event venue is provided. The method includes transmitting beacon messages using short-range wireless communications from a plurality of beacon devices provided at the event venue, wherein each beacon message comprises location identification information; processing using an event module on a mobile electronic device beacon messages received by the mobile electronic device by comparing beacon identification information included as part of the beacon messages to beacon information stored on the mobile electronic device; and displaying event venue information to a user of the mobile electronic device based on the processing of beacon messages received by the mobile electronic device.

In some embodiments, the method is provided so that the short range wireless communications comprises a personal area network communications technology.

In some embodiments, the method is provided so that the short-range wireless communications comprises Bluetooth Low Energy ("BLE") communications.

In some embodiments, the method further includes transmitting the beacon information to the mobile electronic device from a server.

In some embodiments, the method is provided so that the server transmits the beacon information to the mobile electronic device prior to the mobile electronic device being present at the event venue.

In some embodiments, the method further includes determining using the server that the mobile electronic device is likely to be present at the event venue in the future, and so that the server transmits the beacon information to the mobile electronic device based on the determining using the server that the mobile electronic device is likely to be present at the event venue in the future.

In some embodiments, the method is provided so that the beacon messages are transmitted by the plurality of beacon devices with each beacon device of the plurality of beacon devices provided at one of the following locations: an entry point for the event venue; a parking facility for the event venue; a sales site at the event venue; a seating area at the event venue; a point of interest at the event venue; a guest facilities site at the event venue; and a navigation site at the event venue.

In some embodiments, the method is provided so that the event venue information comprises direction information that indicates a route to travel in order to arrive at a predefined destination for the user.

In some embodiments, the method further includes defining using the event module the predefined destination based on an electronic ticket stored on the mobile electronic device In some embodiments, the method further includes recording using the event module a location where the mobile electronic device has been located based at least on beacon identification information included as part of at least one beacon message received by the mobile electronic device and the beacon information stored on the mobile electronic device, and so that the event venue information comprises direction information that indicates a route to travel from a present location of the mobile electronic device in order to arrive at the recorded location where the mobile electronic device has been located.

BRIEF DESCRIPTION OF THE DRAWINGS

FIG. 4A is a diagram showing exemplary beacon information according to some embodiments of the present disclosure.

FIG. 4B is a diagram showing exemplary beacon information according to some embodiments of the present disclosure.

DETAILED DESCRIPTION OF EMBODIMENTS OF THE INVENTION

Figure 1:
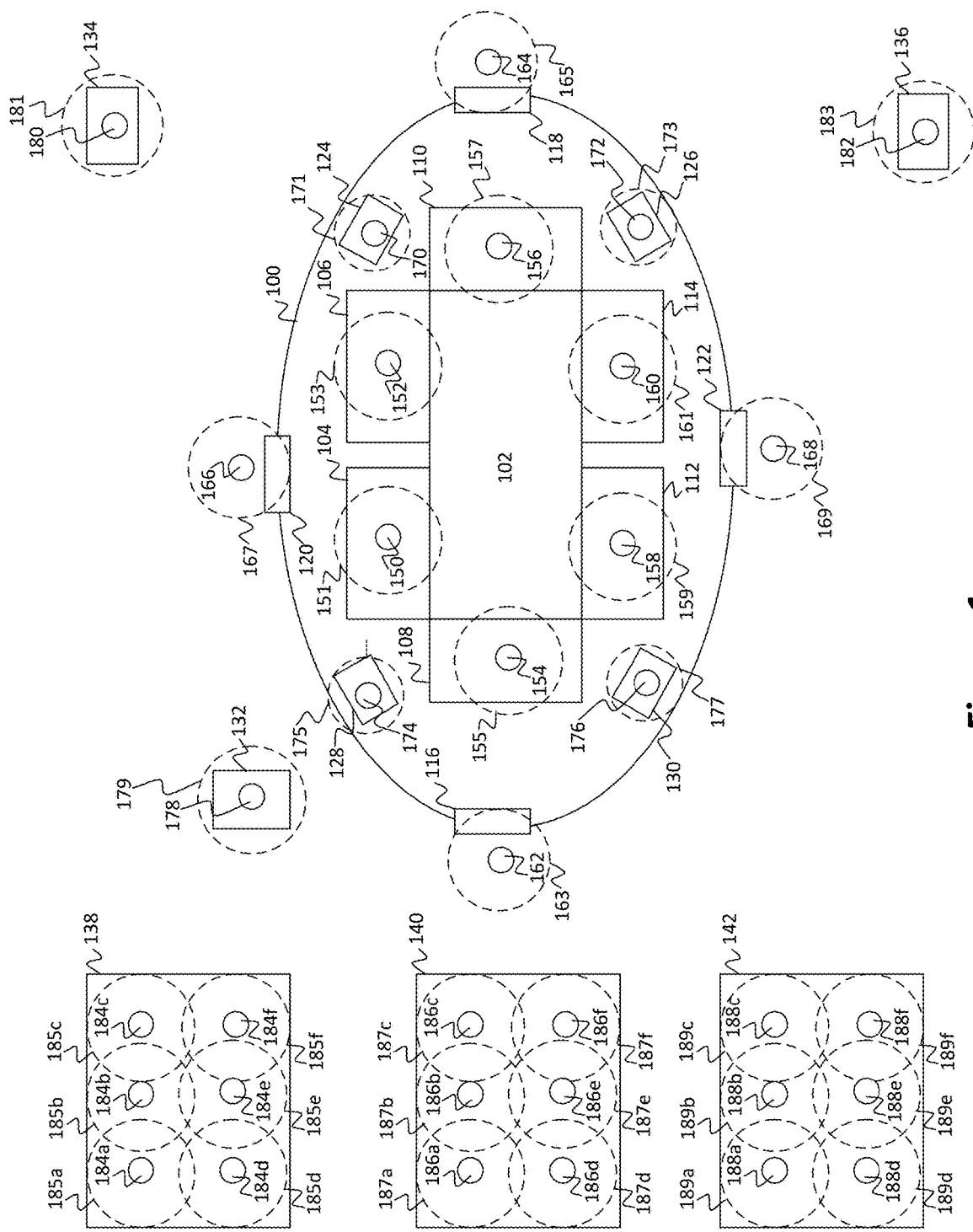
FIG. 1 is a diagram showing an event site with various features according to some embodiments of the present disclosure.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof whether such elements are implemented as hardware or software depends upon the particular application and design constraints imposed on the overall system.

By way of example, an element, or any portion of an element, or any combination of elements may be implemented with "processing electronics" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Embodiments of the present disclosure include location transmission beacons transmitting a signal relevant to an adjacent location, a server storing information as to beacon signals and corresponding locations, and an application on a mobile device providing information and offers to a user of the mobile device based on the mobile device detecting transmissions of the beacons and based on other contextual information.

An embodiment of the present disclosure includes is a system that allows an application running on an end user's mobile Bluetooth LE-capable computing device to offer an adaptive "dashboard" interface to its user, presenting, emphasizing, and modifying different functional and informational modules in that view according to the user's likely physical proximity to a location reference point identified by a Bluetooth LE beacon broadcasting unique identifiers, as well as rules governing user's access to physical facilities and services in the venue, and a user's specific authorization. In this embodiment, the system additionally uses a location ID server that provides a cache of location identifiers and behavioral rules to the application, such that the application can use locally cached data when in constrained network conditions (e.g., a public facility where use of the system of this embodiment may be advantageous).

One exemplary embodiment of the invention includes an Exhibition Venue Access & Guide application. In this embodiment, the exhibition venue is set up with Bluetooth LE beacons placed at: key ingress points (including those for general public admission, and those requiring special ticketed access); attractions; retail locations; and utilitarian points of interest, e.g. restrooms. The user installs the application and registers/logs in, such that their access credentials or authorizations to the facility can be reflected in the application behavior. The application additionally downloads cached information about the facility's beacon identifiers and behavior rules. When the user launches the application, they are presented with a "dashboard," which may be a centralized user interface collecting a series of modules or cards representing discrete information or a particular utility, adapting based on user's privileges, physical location, and general rules.

Continuing the exemplary embodiment, ways that the proximity information may be used with the dashboard are described. When the user is operating their device outside of the defined proximity range of the facility, e.g. when no sighting of Bluetooth devices is available, the dashboard displays: information relevant to someone needing to get to the facility (driving directions/maps), events that might cause them to want to visit the facility (schedule), and access purchase opportunities, if they are not already ticketed for an event there. When a user arrives at the facility, the app may "greet" the user with a notification that directs the user's attention to the dashboard (which will now be adapted to the context of standing outside the facility). When the user is at the facility (as determined by beacons at the facility's perimeter), but has no access credentials (e.g. tickets), the app dashboard may place a 'buy tickets' module at the easiest access point for the user, so that they may most quickly gain access to the facility (which may be their most likely intent). When the user approaches a protected ingress point to a facility, this system's precision allows the dashboard to push their access credentials to the top of the dashboard view right as they arrive in the gate entry line, pushing elements related to navigation to the venue for example to the bottom of the stack or hiding them altogether (as the user is already there). When the user actually enters the protected area of the facility, the system may adapt the dashboard by pushing their access credentials down and pulling up maps that direct them from the specific ingress point to for example their seating area (given knowledge of their access credentials). If the user walks into a retail location within the facility, and views the dashboard, the dashboard may present special offers or coupons specific to that retail facility, and withdraw them from the dashboard stack when the user exits. If the user is part of a special membership or access program, the system may present entirely different options as above, from "VIP entrances" to hiding retail purchase opportunities that are already provided for by their program (food & beverage, for example).

The embodiments described in the disclosure have various innovative features that provide distinct advantages over existing technologies. Embodiments are unique in providing highly targeted assistance. The level of location targeting available with embodiments gives a high degree of utility and simplicity to users navigating and operating a public space. For example, embodiments may involve only presenting options and information to users when a point of interest is in physical sight, or when the user is actually allowed to use a service or enter a protected area. Embodiments allow for the discovery of services and attractions that might not otherwise be known or apparent. In various embodiments of the disclosure, users are not only allowed to fulfill tasks and enjoy services, but to serendipitously discover services and attractions they might not previously have been aware of (or had access to, based on their access privileges). Embodiments of the invention have heightened specificity and accuracy. BLE-based systems used in some embodiments allow extremely small proximity thresholds to be defined, and accurately resolved, as compared to alternatives. This allows behavior to more closely follow user intent. Embodiments have improved performance and resolution time. Some embodiments allow this by using a local sensor network, where the beacons interact directly with the user's terminal device and use locally cached identifiers, rather than intermediated through the public IP network or other centralized server. This may allow significantly faster resolution time than alternatives using IP-based systems. Embodiments allow reduced costs for hardware and power. For embodiments that use BLE, BLE-capable devices are increasingly available, affordable, and power-efficient. This may result in lower hardware costs for both the terminal and the beacon devices compared to alternatives. Embodiments allow reduced deployment cost and complexity. Embodiments may only require installation on key points of interest and ingress/egress points. Because of this, the time, cost, and complexity of installation and surveying is significantly reduced compared to other approaches, for example with 3D indoor mapping alternatives.

The embodiments described in the disclosure do not suffer from key disadvantages present in other systems. GPS based systems have key disadvantages. Many systems use GPS or assisted GPS systems to determine location proximity. Due to their reliance on satellites and network access for resolution, the resolution times can be very long and insufficiently accurate in describing proximity to an object of interest to perform the kind of customizations required by the present disclosure. Network survey based systems have key disadvantages. Some indoor navigation systems use available RF signals in a space (e.g. WiFi access points) to render a 3D map of indoor spaces. This surveying method requires either active effort or very significant sampling from a wide set of devices, and sometimes requires specific access point and RF hardware, significantly adding to the cost and complexity of installation. The amount of statistical inference required to determine proximity also makes for a less precise and accurate reading under many conditions. IP/multi-factor based systems have key disadvantages. Some systems, including local network based and GPS based systems, use access to an IP-based network resources to resolve proximity and rules affecting app behavior, often because they include multiple proximity determination factors (including the above). These systems are disadvantageous in that IP network dependency in the facility frequently damages performance, as the RF conditions are often poor in public spaces. Therefore, using such technologies may not result in adaptation of the dashboard context fast enough to be useful to the user (or clear in what it is presenting). Furthermore, using multi-factor determinations only piles on statistical inferences used by individual technologies (e.g. GPS or WLAN mapping), resulting in further risk of estimation error.

The embodiments described in the disclosure also improve over existing technologies in that user authorization context is used in additional to proximity information. Alternative systems do not factor for user specific context relative to the facility, e.g. their ticketed status, membership status, staff access privileges, etc. The result is that functional elements that cannot be presented to most users might not be made available to authorized users, out of security considerations. Additionally, users without authorization may see access to services unavailable to them, adding confusion and frustration to their experience.

In some embodiments, a wide variety of services can be provided based on the approaches described in the present disclosure. "Greeter" or automatic check-in services may be provided to a user on his mobile device as he approaches the event venue. A personalized dashboard may be provide that presents information based on contextual information about the user and information about where the user is located in the venue. A scavenger hunt services may be provided where a user unlocks a point of interest for various forms of content, such as a special video. In-store coupon may be provided for retail stores at the event venue.

FIG. 1 is a diagram showing an event site with various features according to some embodiments of the present disclosure.

The event site is shown having a stadium 100, a playing field 102, and seating sections 104, 106, 108, 110, 112, and 114. While exemplary, this figure shows that some embodiments of the present disclosure may be used at event sites or event venues that are provided as a conventional sports facility. In other embodiments, the event site may be a concert hall, amusement park, fairgrounds, etc.

The event site is shown having entry points 116, 118, 120, and 122. These entry points 116, 118, 120, and 122 may be controlled entrances to the stadium 100. Guests visiting stadium 100 may pass thorough the entry points 116, 118, 120, and 122 to view a sports game taking place on field 102. Guests may present some form of information demonstrating a right to entry for the event, such as with printed tickets or electronic tickets stored on mobile electronic devices carried by the guests.

The event site is shown having facilities 124, 126, 128, and 130. Facilities 124, 126, 128, and 130 may be any facilities provided at the stadium 100 that may be used by guests during the event. Facility 124 may be a restroom facility. Facility 126 may be a concession stand. Facility 128 may be a store selling merchandise. Facility 130 may be a restroom facility. A variety of other types of facilities may be used in conjunction with various embodiments of the present disclosure.

The event site is shown having point of interest 132. Point of interest 132 may be any place at the event site that guests may wish to visit while at the event site for the event. Point of interest 132 may be a statue, park, museum, or other attraction. A variety of other types of points of interest may be used in conjunction with various embodiments of the present disclosure.

The event site is shown having transit facilities 134, 136, 138, 140, and 142. Transit facilities 134, 136, 138, 140, and 142 may be facilities provided at the event site in order to allow guests to arrive at the event site by various forms of transit. Transit facility 134 may be a train station. Transit facility 136 may be a pedestrian entrance connecting the event site with a nearby population center. Transit facilities 138, 140, and 142 may be parking lots.

The event site is shown having beacon device 150 with beacon device range 151. Beacon device 150 may be an electronic device that transmits beacon messages. The beacon messages may include beacon identification information, which identifies which beacon device (i.e., beacon device 150) the beacon message was received from. Beacon device 150 may transmit beacon messages in a broadcast form. Beacon device 150 may transmit beacon messages using short-range wireless communications. In some embodiments, Bluetooth or Bluetooth Low Energy ("BLE") short-range wireless communications technology may be used. In some embodiments, some other personal area network communications technology may be used.

Beacon device 150 is shown as positioned in seating section 104. In this way, beacon device 150 is associated with seating section 104. Therefore, a mobile electronic device can determine that it is in or near seating section 104 based on receiving a beacon message with corresponding beacon identification information from beacon device 150. Examples of how the mobile electronic device can make such a determination, i.e., how it can associate beacon device 150 with seating section 104, are discussed elsewhere in the present disclosure.

Beacon device range 151 may be an approximate range of communications of beacon device 150. Namely, the beacon messages transmitted by beacon device 150 may only be receivable by a mobile electronic device within the area covered by beacon device range 151. In some embodiments, a short-range wireless communications technology may be preferable for beacon device 150 given that this will limit the beacon device range 151 to approximately the area of the associated seating section 104. Therefore, a mobile electronic device may only receive beacon message from beacon device 150 if it is in or near the associated seating section 104.

While beacon device 150 is shown positioned at approximately a center point of associated seating section 104 and is shown using omnidirectional transmission, other configuration are possible in various embodiments of the present disclosure. For example, beacon device 150 could be placed at an outer edge of seating section 104 and using a directional antenna. In this case, beacon device range 151 may be sector-shaped and directed inwards from beacon device 150 towards the center of seating section 104. Such an approach may be effective in reducing the reception of beacon messages from beacon device 150 by mobile electronic devices that are not actually in seating section 104. A variety of other configuration of beacon device 150 and beacon device range 151 for coverage of associated seating section 104 are possible in various embodiments of the present disclosure.

The event site is shown having numerous other beacon devices and beacon device ranges. Beacon devices 152, 154, 156, 158, 160, 162, 164, 166, 168, 170, 172, 174, 176, 178, 180, 182, 184*a*, 184*b*, 184*c*, 184*d*, 184*e*, 184*f*, 186*a*, 186*b*, 186*c*, 186*d*, 186*e*, 186*f*, 188*a*, 188*b*, 188*c*, 188*d*, 188*e*, and 188*f* are shown. Each of these beacon devices may be provided as discussed with respect to beacon device 150 above, except that each beacon device is associated with the respective seating section, entry point, facility, point of interest, or transit facility in which it is shown as positioned. For clarity, beacon devices 162, 164, 166, and 168 are associated with entry points 116, 118, 120, and 122, respectively. Beacon device ranges 153, 155, 157, 159, 161, 163, 165, 167, 169, 171, 173, 175, 177, 179, 181, 183, 185*a*, 185*b*, 185*c*, 185*d*, 185*e*, 185*f*, 187*a*, 187*b*, 187*c*, 187*d*, 187*e*, 187*f*, 189*a*, 189*b*, 189*c*, 189*d*, 189*e*, and 189*f* are shown. Each of these beacon device ranges may be provided as discussed with respect to beacon device range 151 above, except that each beacon device range is associated with the respective beacon device around which it is shown as positioned.

Using the elements shown in FIG. 1 and just described, a mobile electronic device being moved throughout the event venue may be able to determine where it is presently located at the event venue with respect to various venue-specific locations. As previously described, this determination can be made based on the beacon messages containing beacon identification information received from the various beacon devices positioned throughout the event venue. In this way, and as described elsewhere in the present disclosure, it is possible to determine where a user of the mobile electronic device is presently located, and, based on that determination, to provide relevant event venue information, such as providing wayfinding information to assist the user in arriving at some other venue-specific location.

Figure 2:
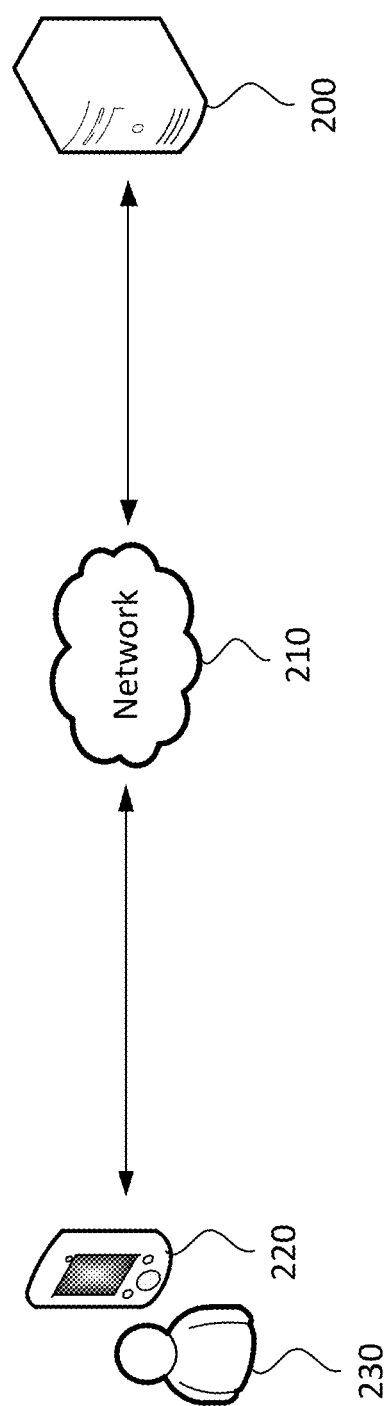
FIG. 2 is a diagram showing a communications system according to some embodiments of the present disclosure.

FIG. 2 is a diagram showing a communications system according to some embodiments of the present disclosure. A server 200, a network 210, a mobile electronic device 220, and a user 230 are shown. Server 200 may be any computing device that is capable of transmitting information to mobile electronic device 220 through network 210. Though server 200 is recited as a server, a variety other computing devices may be used in various embodiments of the present disclosure. Network 210 may be any of a variety of communications networks. For example, network 210 may include the Internet, a local area network, the Internet and a local area network, or various other combinations of communications networks. Mobile electronic device 220 may be any of a variety of mobile electronic devices. For example, mobile electronic device 220 may be a cellular telephone, a smartphone, a tablet computer, etc. Mobile electronic device 220 may be used by user 230. User 230 may carry mobile electronic device 220 with him while at an event site or event venue. User 230 may carry mobile electronic device 220 with him prior to arrival at an event site or event venue.

In some embodiments, server 200 may transmit beacon information to mobile electronic device 220 by way of network 210. The beacon information so transmitted may include a mapping of beacon identification information values to venue-specific locations for an event venue. The server 200 may store the beacon information prior to transmitting the beacon information to mobile electronic device 220. The server 200 may transmit the beacon information to mobile electronic device 220 in response to a request for such information from mobile electronic device 220. In some embodiments, network 210 may be a network that is not provided at the event venue. Instead, network 210 is a network provided at a home of the user 230, at a workplace of the user 230, or elsewhere. In such cases, the mobile electronic device 220 may request the beacon information prior to arrival at the event venue. The server 200 may then transmit the beacon information to the mobile electronic device 220 using network 210 prior to the mobile electronic device 220 arriving at the event venue to which the beacon information pertains. Server 200 may also transmit an electronic ticket, route information, and map information to mobile electronic device 220.

Figure 3:
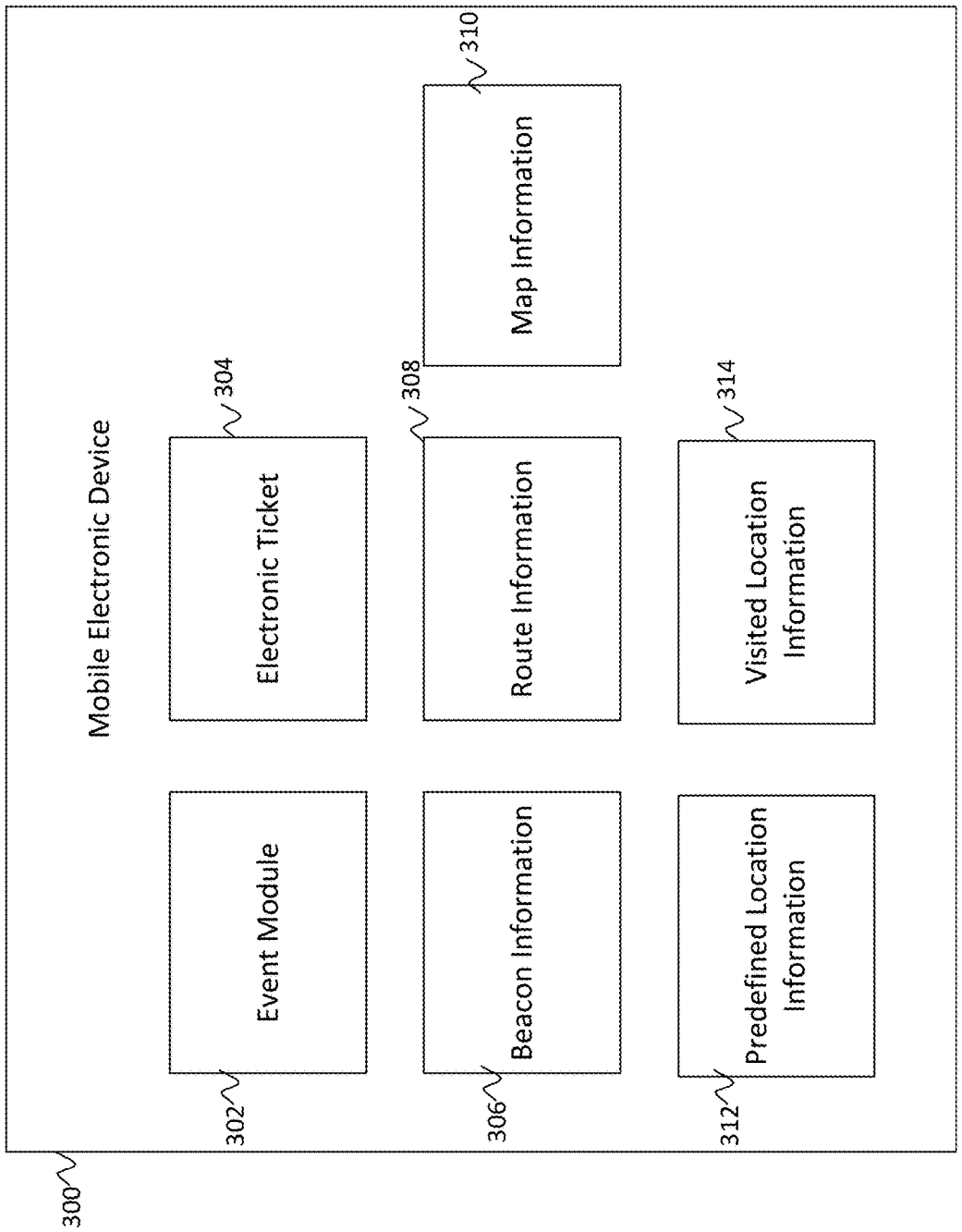
FIG. 3 is a block diagram showing various components of a mobile electronic device according to some embodiments of the present disclosure.

FIG. 3 is a block diagram showing various components of a mobile electronic device according to some embodiments of the present disclosure. Mobile electronic device 300 is shown having event module 302, electronic ticket 304, beacon information 306, route information 308, map information 310, predefined location information 312, and visited location information 314.

Event module 302 may be a software and/or hardware module provided on mobile electronic device 300. Event module 302 may process beacon messages received by the mobile electronic device 300. This processing may involve determining beacon identification information provided in the beacon message. This processing may involve comparing the beacon identification information to beacon information 306 stored on the mobile electronic device 300. This processing may involve displaying or otherwise providing event venue information to the user of the mobile electronic device 300 based at least on a present location of the user and mobile electronic device determined from the beacon identification information and beacon information. In some embodiments, the event venue information so provided may include information in an adaptive dashboard. In some embodiments, the event venue information so provided may include wayfinding information. In some embodiments, the wayfinding information so provided may include a route from the present location of the mobile electronic device 300 to some other venue-specific location. This route may be based on route information 308. In some embodiments, the wayfinding information so provided may include a map of the event venue. The map may include an indicator of the present location of the mobile electronic device 300. This map may be based on map information 310. In some embodiments, the wayfinding information so provided may include information for arriving at a predefined location at the event venue. The predefined location may be based on predefined location information 312. In some embodiments, the wayfinding information so provided may include information for arriving at a visited location at the event venue. The visited location may be based on visited location information 314. The wayfinding information so provided may be provided in a variety of other forms in various embodiments of the present disclosure.

Electronic ticket 304 may be a ticket for entry to an event venue that is stored on mobile electronic device 300. Electronic ticket 304 may contain information that is effective to grant the user of mobile electronic device 300 access to an event venue. Electronic ticket 304 may contain information identifying for which event venue it is valid. Electronic ticket 304 may contain information identifying for what event it is valid. Electronic ticket 304 may contain information identifying a date and time of an event for which it is valid. Electronic ticket 304 may contain information identifying for which persons it is valid. Electronic ticket 304 may be transmitted from a server or some other computing device to the mobile electronic device 300 prior to an event for which the electronic ticket 304 grants access to the event venue. Electronic ticket 304 may be provided in a variety of other ways in various embodiments of the present disclosure.

Beacon information 306 may be information about beacons provided at an event venue. Beacon information 306 may include information providing a mapping of beacon identification information to venue-specific locations at an event venue. Beacon information 306 may include information providing a mapping of beacon identification information to a grid location, latitude/longitude, or other absolute location. Beacon information 306 may be transmitted from a server or some other computing device to the mobile electronic device 300 prior to an event at the venue to which the beacon information 306 pertains. Beacon information 306 may be provided in a variety of other ways in various embodiments of the present disclosure.

Route information 308 may be information about routes at an event venue. Route information 306 may include information about a route to travel from one venue-specific location to another venue-specific location at an event venue. Route information 306 may include information about high-volume passages at an event venue that may be a preferred path of travel for visitors to the event venue. Route information 306 may include information allowing the visual presentation of a path overlaid on a map of the event venue. Route information 308 may be transmitted from a server or some other computing device to the mobile electronic device 300 prior to an event at the venue to which the route information 308 pertains. Route information 308 may be provided in a variety of other ways in various embodiments of the present disclosure.

Map information 310 may be information about a map of an event venue. Map information 310 may include information that can be used by event module 302 or some other component of mobile electronic device 300 to visually present a map of the event venue to which it pertains. Map information 310 may include information that can be used to label or otherwise highlight various venue-specific locations of the event venue. Map information 310 may be transmitted from a server or some other computing device to the mobile electronic device 300 prior to an event at the venue to which the map information 310 pertains. Map information 310 may be provided in a variety of other ways in various embodiments of the present disclosure.

Predefined location information 312 may be information about a location at an event venue. Predefined location information 312 may include identification of a venue-specific location at an event venue. Predefined location information 312 may include identification of a grid location, latitude/longitude, or other absolute location. In some embodiments, event module 302 or some other component of mobile electronic device 300 may process the electronic ticket 304 in order to define the predefined location information 312 prior to an event to which the electronic ticket 304 pertains. For example, after electronic ticket 304 is stored on mobile electronic device 300, but prior to an event to which electronic ticket 304 pertains, event module 302 may process electronic ticket 304 in order to determine a seating section assignment for the electronic ticket 304. Event module 302 may then use beacon information 306 or some other information to determine a venue-specific location (e.g., "Seating Section 104") or an absolute location (e.g., "grid location <9, 5>) for the seating section assignment. Event module 302 may define predefined location information 312 based on this venue-specific location or absolute location. Predefined location information 312 may be provided in a variety of other ways in various embodiments of the present disclosure.

Visited location information 314 may be information about a location at an event venue. Visited location information 314 may include identification of a venue-specific location at an event venue. Visited location information 314 may include identification of a grid location, latitude/longitude, or other absolute location. In some embodiments, event module 302 or some other component of mobile electronic device 300 may define visited location information 314 while the mobile electronic device 300 and its user are at the event venue. In some embodiments, event module 302 or some other component of mobile electronic device 300 may define visited location information 314 based on a location at the venue that the mobile electronic device 300 and its user have already visited, as determined by processing beacon messages received by the mobile electronic device 300. For example, after mobile electronic device 300 and its user arrive at an event venue, the mobile electronic device 300 may receive a beacon message for a beacon device covering a parking lot at the event venue. The beacon message may contain beacon identification information identifying the beacon device and thereby the associated parking lot. The event module may process the beacon message and beacon identification information using the beacon information 306 in order to determine that the mobile electronic device 300 and its user have already visited "North Parking." Event module 302 may define visited location information 314 based on this venue-specific location or an absolute location. Event module 302 may be configured to store this venue-specific location based on it being a first location visited by the mobile electronic device 300, based on it being a transit location visited by the mobile electronic device 300, based on it being a first transit location visited by the mobile electronic device 300, or based on some other factors. Visited location information 314 may be provided in a variety of other ways in various embodiments of the present disclosure.

FIGS. 4A and 4B are diagrams showing exemplary beacon information according to some embodiments of the present disclosure. FIG. 4A shows a table 400 of beacon information. FIG. 4B shows a table 400 of beacon information that is an extension of table 400 from the previous figure. As shown, records of table 400 include a beacon ID value, a location name value, and a location value. The beacon ID value may correspond to beacon identification information included in beacon messages transmitted by beacon devices. The location name value may provide a venue-specific location identifier for a particular venue. For example, "Seating Section 104" may be a venue-specific location identifier that can be used to locate a position within the event venue using map information (such as that previously discussed). The location value may be an absolute location identifier that can be used to locate a position, including a position within the event venue. The location value may define a position within the event venue without limitation to the various seating sections, facilities, and other venue-specific locations at the event venue. For example, a grid may be defined as overlaying the event venue, with its origin in the top-left of an overhead view of the event venue. A first coordinate may define a rightward movement while a second coordinate may define a downward movement. As such, seating section 104 may be at position <9, 5> while seating section 106 may be at position <11, 5>. The location value may be provided as various other absolute location values, such as a latitude/longitude value. Table 400 may be include a variety of other elements of information according to various embodiments of the present disclosure.

As shown in table 400, a distinct beacon ID value may be provided for each venue-specific location. For example, for a location name value of "Seating Section 104," a beacon ID value of "150" is provided. For a location name value of "Seating Section 106," a beacon ID value of "152" is provided. For exemplary purposes, these beacon ID values are shown as corresponding to the item identifiers of various beacon devices in FIG. 1. Continuing this example, it can be understood that numerous beacon devices may be assigned the same beacon identification information and thus match the same beacon ID value from table 400. For instance, while six different beacon devices (184*a*, 184*b*, 184*c*, 184*d*, 184*e*, 184*f*) are provided in transit facility 138 (which may be "North Parking" from table 400), only a single beacon ID value ("184") for "North Parking" is provided in table 400. As such, all six of the different beacon devices (184*a*, 184*b*, 184*c*, 184*d*, 184*e*, 184*f*) may transmit beacon messages with the same beacon identification information. This may be preferable because all of the different beacon devices correspond to the same venue-specific location, i.e., North Parking. In some embodiments, the beacon devices may be configured to transmit different beacon identification information, with separate records in table 400 for each different beacon ID value. A variety of other mappings of beacon identification information to locations at an event venue may be used in various embodiments of the present disclosure.

Figure 5:
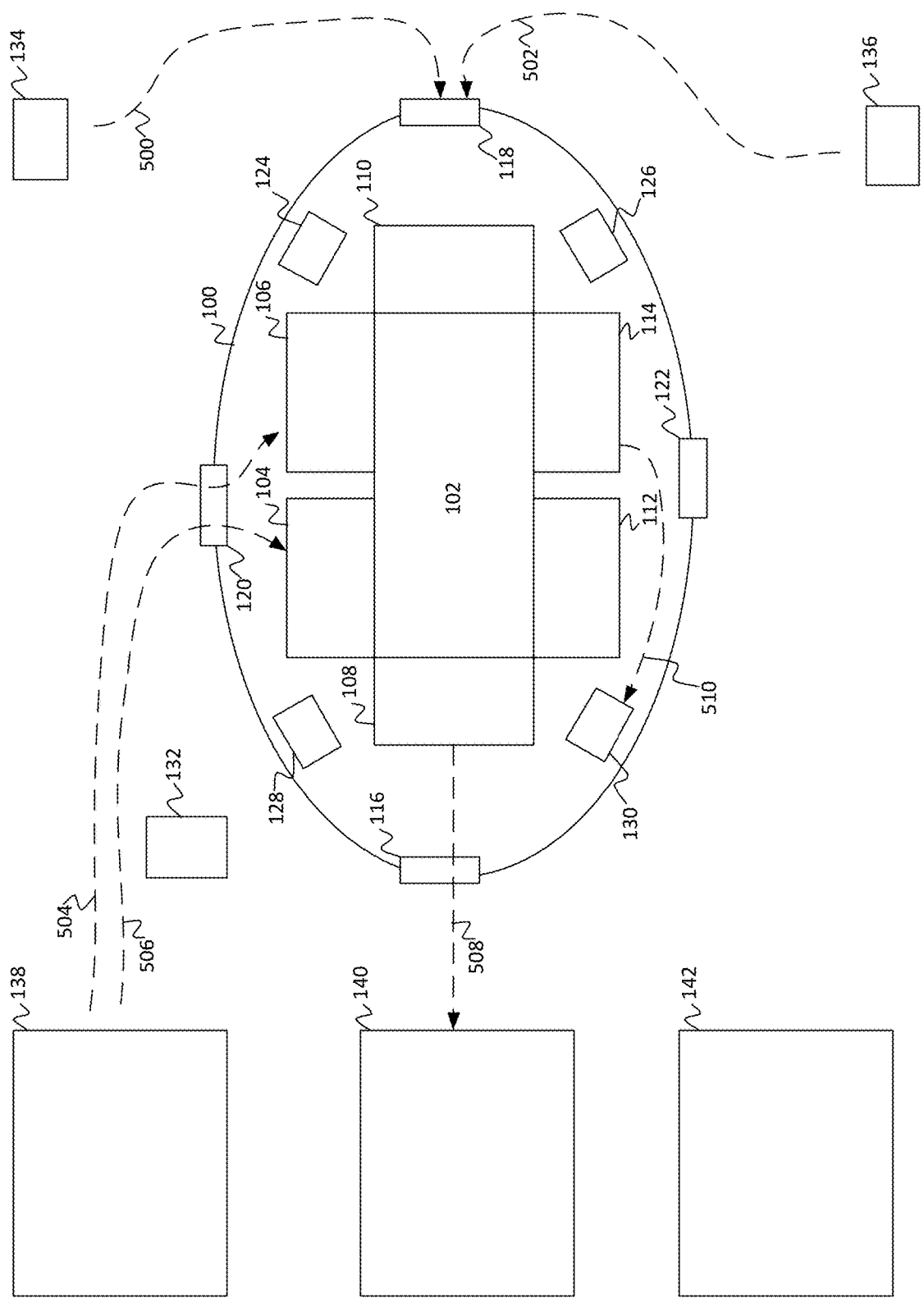
FIG. 5 is a diagram showing exemplary route information according to some embodiments of the present disclosure.

FIG. 5 is a diagram showing exemplary route information according to some embodiments of the present disclosure. Various items from FIG. 1 are shown. In addition, routes 500, 502, 504, 506, 508, and 510 are shown. Any of routes 500, 502, 504, 506, 508, and 510 may be visually presented to a user of a mobile electronic device based on map information stored on the mobile electronic device (such as that previously discussed). Any of routes 500, 502, 504, 506, 508, and 510 may visually presented based on a present location of the user and mobile electronic device and some destination location. The destination location may be defined based on predefined information location, visited location information, a venue-specific location selected by the user, or some other location information. The routes shown in the present figure are exemplary, and a variety of other routes may be presented in various embodiments of the present disclosure.

An example using route 500 may be considered. Route 500 may be visually presented to a user that arrives at Train Station 134. Upon arriving at train station 134, the mobile electronic device may receive and process beacon messages containing beacon identification information. The beacon identification information may indicate a beacon ID value of "180." The mobile electronic device may use beacon information present on the mobile electronic device to determine that the user and mobile electronic device have arrived at Train Station 134. The mobile electronic device may determine based on map information stored on the mobile electronic device (such as that previously discussed) that Entry Point 118 is the nearest entry point for the user. The mobile electronic device may display of map of the event venue (such as that shown in the present figure) with route 500. This may assist the user of the mobile electronic device to arrive via a preferred route to an entry point of the event venue.

An example using route 502 may be considered. Route 502 may be visually presented to a user of a mobile electronic device in a similar fashion as with route 500. However, route 502 may be visually presented to a user of the mobile electronic device when the user and the mobile electronic device pass through Southeast Pedestrian Access 136.

An example using route 504 may be considered. For example, a user may arrive at the event venue with a mobile electronic device and park his vehicle in North Parking 138. The mobile electronic device may have already stored predefined location information indicating that the user has tickets for Seating Section 106. When the mobile electronic device arrives in North Parking 138, it may receive beacon messages containing beacon identification information. The beacon identification information may indicate a beacon ID value of "184." The mobile electronic device may use beacon information present on the mobile electronic device to determine that the user and mobile electronic device have arrived at North Parking 138. The mobile electronic device may store "North Parking" as visited location information on the mobile electronic device. Based on the present location in North Parking 138 and a predefined location of Seating Section 106, the mobile electronic device may determine that the nearest entry point for the user is Entry Point 120. The mobile electronic device may display of map of the event venue (such as that shown in the present figure) with route 504 as a route from the user's present location in North Parking 138, through Entry Point 120, and to Seating Section 104.

An example using route 506 may be considered. Route 506 may be visually presented to a user of a mobile electronic device in a similar fashion as with route 504. However, route 506 may be visually presented to a user of the mobile electronic device when the user and the mobile electronic device arrive at North Parking 138 and have predefined location information identifying Seating Section 106.

An example using route 508 may be considered. For example, route 508 may be visually presented to a user of a mobile electronic device after an event at the event venue has completed. The user and mobile electronic device may have previously arrived at Central Parking 140, such as prior to the beginning of the event. The mobile electronic device may have stored Central Parking 140 as visited location information on the mobile electronic device. The user may have then attended the event, sitting in Seating Section 108. Based on determining that the event has completed, the mobile electronic device may display of map of the event venue (such as that shown in the present figure) with route 508 as a route from the user's present location to the visited location of Central Parking 140. The mobile electronic device may determine that the event has completed based on an input from the user. The mobile electronic device may determine that the event has completed based on a signal received from some other computing device via wireless communications technology. Using route 508, the user may be able to more effectively return to his vehicle after the event has completed.

An example using route 510 may be considered. Route 510 may be visually presented to a user of a mobile electronic device in order to present a route to a facility at the event venue. Based on receiving an input from the user, the mobile electronic device may determine that the user desires to visit a restroom facility at the event venue. The mobile electronic device may determine based on map information stored on the mobile electronic device (such as that previously discussed) that Southwest Restrooms 130 are the nearest restrooms for the user. The mobile electronic device may display of map of the event venue (such as that shown in the present figure) with route 510 as a route from the user's present location to Southwest Restrooms 130.

A variety of other routes may be visually presented and a variety of other scenarios for their presentation may be provided in various embodiments of the present disclosure.

Figure 6:
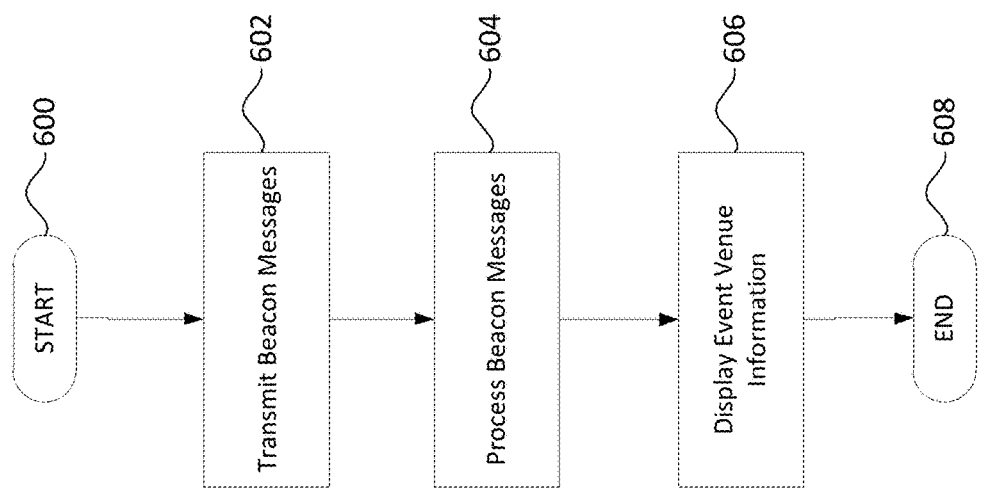
FIG. 6 is a flowchart showing a process for wayfinding at an event venue according to some embodiments of the present disclosure.

FIG. 6 is a flowchart showing a process for providing event venue information at an event venue according to some embodiments of the present disclosure. The process starts at step 600.

At step 602, beacon messages are transmitted. This may include transmitting beacon messages from numerous beacon devices provided at an event venue. Each beacon device may be provided at an entry point for the event venue; a parking facility for the event venue; a sales site at the event venue; a seating area at the event venue; a point of interest at the event venue; a guest facilities site at the event venue; or a navigation site at the event venue. A navigation site may be a point along a high volume passage through which a route presented to a user of the mobile electronic device passes. Transmitting beacon messages may include transmitting beacon messages using short-range wireless communications. Short-range wireless communications may include personal area network communications technologies. Short-range wireless communications may include Bluetooth Low Energy ("BLE") communications. This may include providing beacon identification information as part of each beacon message. The beacon messages may be received by a mobile electronic device.

At step 604, beacon messages are processed. This may include processing beacon messages received by the mobile electronic device. This may include processing, using an event module provided on the mobile electronic device, the beacon messages received by the mobile electronic device. Processing the beacon messages may include comparing beacon identification information included in the beacon messages to beacon information stored on the mobile electronic device.

At step 606, event venue information is displayed. This may include displaying information in an adaptive dashboard. This may include displaying wayfinding information based on a result of processing beacon messages in the previous step. Displaying wayfinding information may include displaying a map of the event venue along with an indicator of the present location of a user of the mobile electronic device. Displaying wayfinding information may include displaying a map of the event venue along with indicators of the present location of a user of the mobile electronic device and a predefined location. Displaying wayfinding information may include displaying a map of the event venue along with indicators of the present location of a user of the mobile electronic device and a visited location. Displaying wayfinding information may include presenting direction information that indicates a route that a user of the mobile electronic device should travel. The route may be a route to a predefined destination, such as a seating section, based on predefined location information stored on the mobile electronic device. The route may be a route to a recorded location where the user and mobile electronic device have already visited, such as a parking lot, based on visited location information stored on the mobile electronic device. Displaying wayfinding information may include a variety of other information displays in various embodiments of the present disclosure.

The process ends at step 608.

Figure 7:
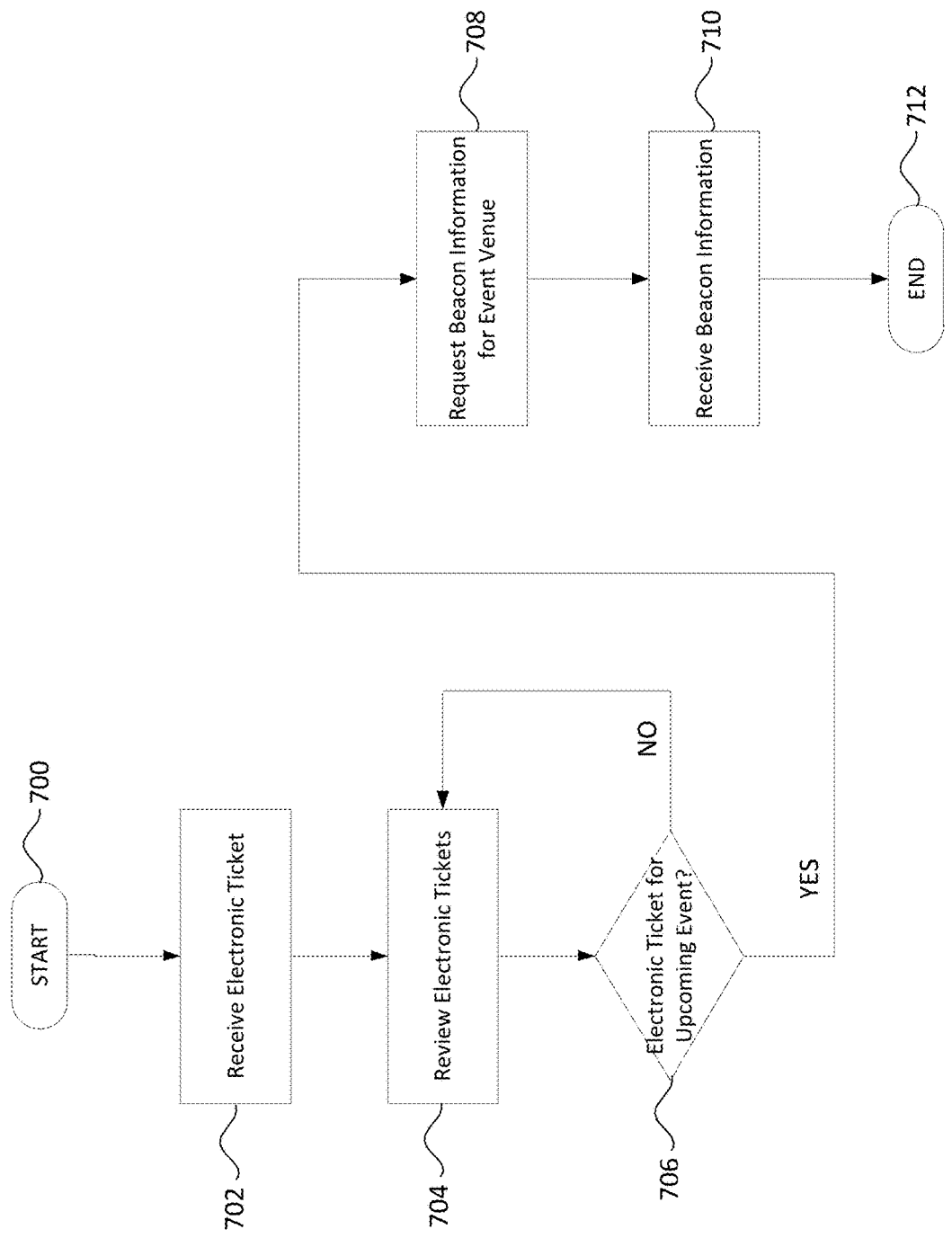
FIG. 7 is a flowchart showing a process for wayfinding at an event venue according to some embodiments of the present disclosure.

FIG. 7 is a flowchart showing a process for providing event venue information at an event venue according to some embodiments of the present disclosure. The process of this figure may be used in particular for providing beacon information to a mobile electronic device. The process starts at step 700.

At step 702, an electronic ticket is received. Receiving an electronic ticket may include receiving an electronic ticket at a mobile electronic device. Receiving an electronic ticket may include receiving an electronic ticket from a server or other computing device. Receiving an electronic ticket may include receiving an electronic ticket from a server or other computing device over the Internet. Receiving an electronic ticket may include receiving an electronic ticket from a server or other computing device prior to the mobile electronic device arriving at an event venue to which the electronic ticket relates. After the electronic ticket is received, it may be stored on the mobile electronic device.

At step 704, electronic tickets are reviewed. Reviewing electronic tickets may include reviewing electronic tickets using an event module or other component of a mobile electronic device on which the electronic tickets are stored. Reviewing electronic tickets may include checking whether an electronic ticket has been recently received. Reviewing electronic tickets may include retrieving information from the electronic tickets as to a date and time of an event to which each electronic ticket relates. This date and time information may be used in the next step.

At step 706, a determination is made as to whether an electronic ticket is for an upcoming event. This determination may involve checking whether the electronic ticket is for an event that occurs within the next X days. For example, this may involve checking whether the electronic ticket is for an event that occurs in the next seven days. If the electronic ticket is not for an upcoming event, then the process repeats step 704. This may be conducted after some delay, such as every day. If the electronic ticket is for an upcoming event, then the process continues at step 708.

At step 708, beacon information for an event venue is requested. Requesting beacon information may include sending a request to a server or some other computing device. Requesting beacon information may include sending a request to a server or some other computing device over the Internet. Requesting beacon information may include sending a request for beacon information for an event venue related to the electronic ticket for the upcoming event. Based on determining that an electronic ticket is for an upcoming event in step 706, step 708 may be performed so that beacon information can be retrieved and stored on the mobile electronic device prior to the upcoming event.

At step 710, beacon information is received. Receiving beacon information may include receiving beacon information in response to the requesting performed as part of step 708. Receiving beacon information may include receiving beacon information prior to an upcoming event at an event venue with which the beacon information is associated. Receiving beacon information may include receiving beacon information from a server or some other computing device. Receiving beacon information may include receiving beacon information from a server or some other computing device over the Internet. After the beacon information is received, it may be stored on the mobile electronic device for use when at the event venue for the upcoming event.

The process ends at step 712. Using the process of the present figure, a mobile electronic device may be able to retrieve beacon information for an event venue in advance of arrival at the event venue. This may be advantageous for various reasons. First, the mobile electronic device my use a network or other communications system that has a higher bandwidth or is otherwise less congested that such a communications system provided at the event venue. Second, the mobile electronic device may be able to immediately process beacon messages and display event venue information upon arrival at the event venue for the upcoming event, as opposed to there being a delay during retrieval of beacon information upon arrival at the event venue.

In some embodiments, additional information may be requested and received as part of the process shown in FIG. 7. For example, route information for the event venue of the upcoming event may be requested and received along with the beacon information. As another example, map information for the event venue of the upcoming event may be requested and received along with the beacon information.

Figure 8:
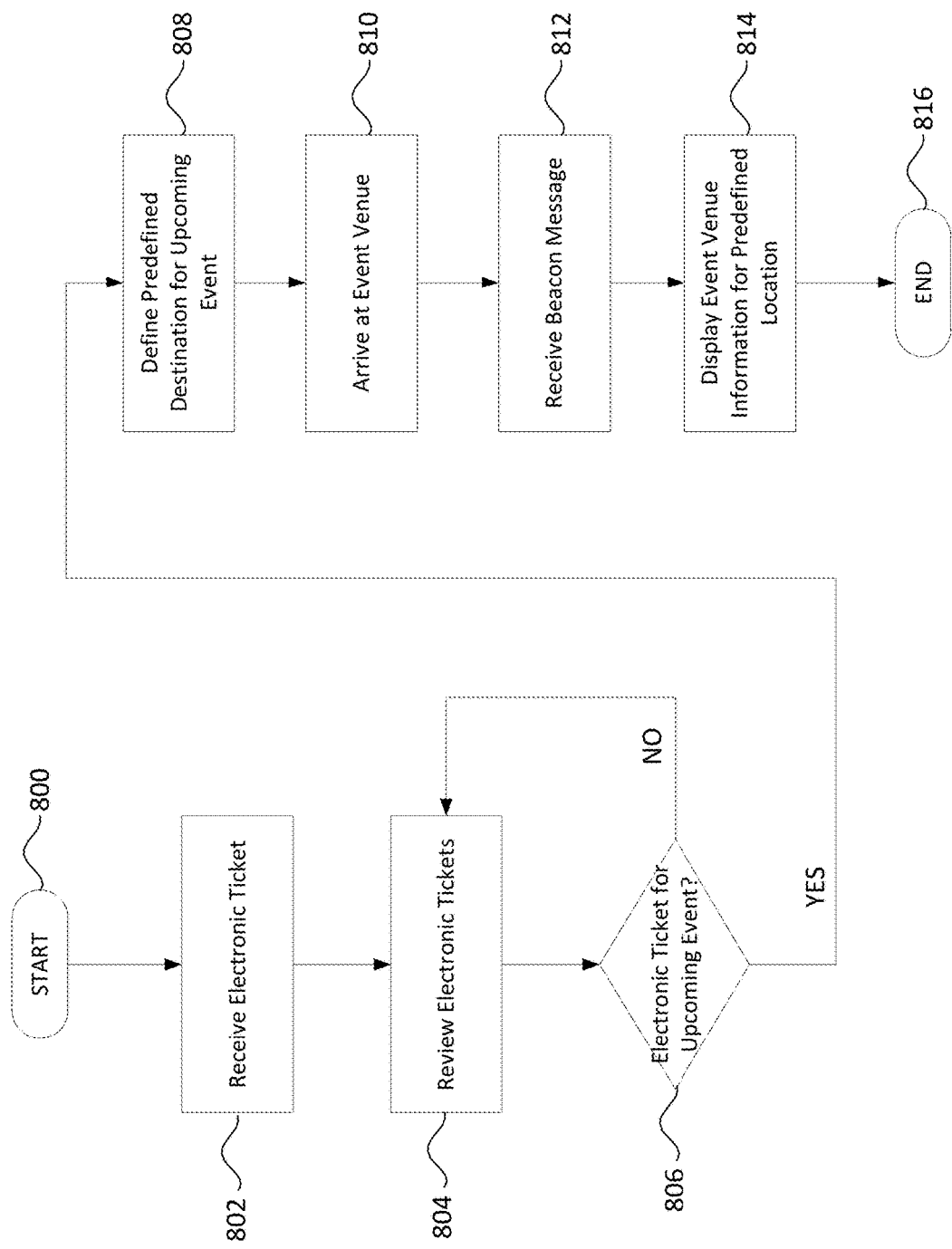
FIG. 8 is a flowchart showing a process for wayfinding at an event venue according to some embodiments of the present disclosure.

FIG. 8 is a flowchart showing a process for wayfinding at an event venue according to some embodiments of the present disclosure. The process of this figure may be used in particular for defining a predefined location and using that predefined location as part of wayfinding at an event venue. The process starts at step 800.

At step 802, an electronic ticket is received. Receiving an electronic ticket may include receiving an electronic ticket at a mobile electronic device. Receiving an electronic ticket may include receiving an electronic ticket from a server or other computing device. Receiving an electronic ticket may include receiving an electronic ticket from a server or other computing device over the Internet. Receiving an electronic ticket may include receiving an electronic ticket from a server or other computing device prior to the mobile electronic device arriving at an event venue to which the electronic ticket relates. After the electronic ticket is received, it may be stored on the mobile electronic device.

At step 804, electronic tickets are reviewed. Reviewing electronic tickets may include reviewing electronic tickets using an event module or other component of a mobile electronic device on which the electronic tickets are stored. Reviewing electronic tickets may include checking whether an electronic ticket has been recently received. Reviewing electronic tickets may include retrieving information from the electronic tickets as to a date and time of an event to which each electronic ticket relates. This date and time information may be used in the next step.

At step 806, a determination is made as to whether an electronic ticket is for an upcoming event. This determination may involve checking whether the electronic ticket is for an event that occurs within the next X days. For example, this may involve checking whether the electronic ticket is for an event that occurs in the next seven days. If the electronic ticket is not for an upcoming event, then the process repeats step 804. This may be conducted after some delay, such as every day. If the electronic ticket is for an upcoming event, then the process continues at step 808.

At step 808, a predefined destination is defined for an upcoming event. Defining a predefined destination may include using an event module or other component of a mobile electronic device on which the electronic ticket is stored. Defining a predefined destination may involve storing predefined location information on a mobile electronic device on which the electronic ticket is stored. Defining a predefined destination may be performed based on reviewing the electronic ticket for any information indicating a venue-specific location, such as a seating section, an entry point, a parking location, etc. Defining a predefined destination may be performed based on determining that the electronic ticket relates to a particular venue-specific location. Defining a predefined destination may include storing this venue-specific location so determined as predefined location information on the mobile electronic device. In some embodiments, defining a predefined destination may be performed prior to the arrival of the mobile electronic device and its user at the event venue. In this way, the predefined location and predefined location information may be considered "predefined" based on being defined prior to arrival at the event venue. As an example, defining a predefined destination may be based on reviewing the electronic ticket, observing that the electronic ticket is for a seat in Seating Section 104 at the event venue, and thereby storing "Seating Section 104" as predefined location information on the mobile electronic device.

At step 810, arrival at the event venue is performed. Arrival at the event venue may include a mobile electronic device on which are stored the predefined location and the electronic ticket arriving at an event venue to which the predefined location and the electronic ticket relate.

At step 812, beacon messages are received. Receiving beacon messages may include receiving beacon messages at the mobile electronic device from a beacon device provided at the event venue.

At step 814, event venue information for the predefined location is displayed. This may include displaying information for the predefined location in an adaptive dashboard. This may include displaying wayfinding information for the predefined location. Displaying wayfinding information for the predefined location may include displaying information to a user of the electronic device that assists in the user arriving at the predefined location. Displaying wayfinding information for the predefined location may include displaying a route from the present location of the mobile electronic device, as determined by the received beacon messages in the previous step, to the venue-specific location previously defined as the predefined location. Displaying wayfinding information for the predefined location may include displaying a map of the event venue, displaying an indicator of the user's present location on the map, and displaying an indicator of the predefined location on the map.

The process ends at step 816. Using the process of the present figure, a mobile electronic device may be able to define in advance a location of particular interest to the user of the mobile device for an event venue that the user will be visiting. In this way, the mobile electronic device may be able to immediately display event venue information for arriving at that location of particular interest to the user as soon as the user arrives at the event venue.

Figure 9:
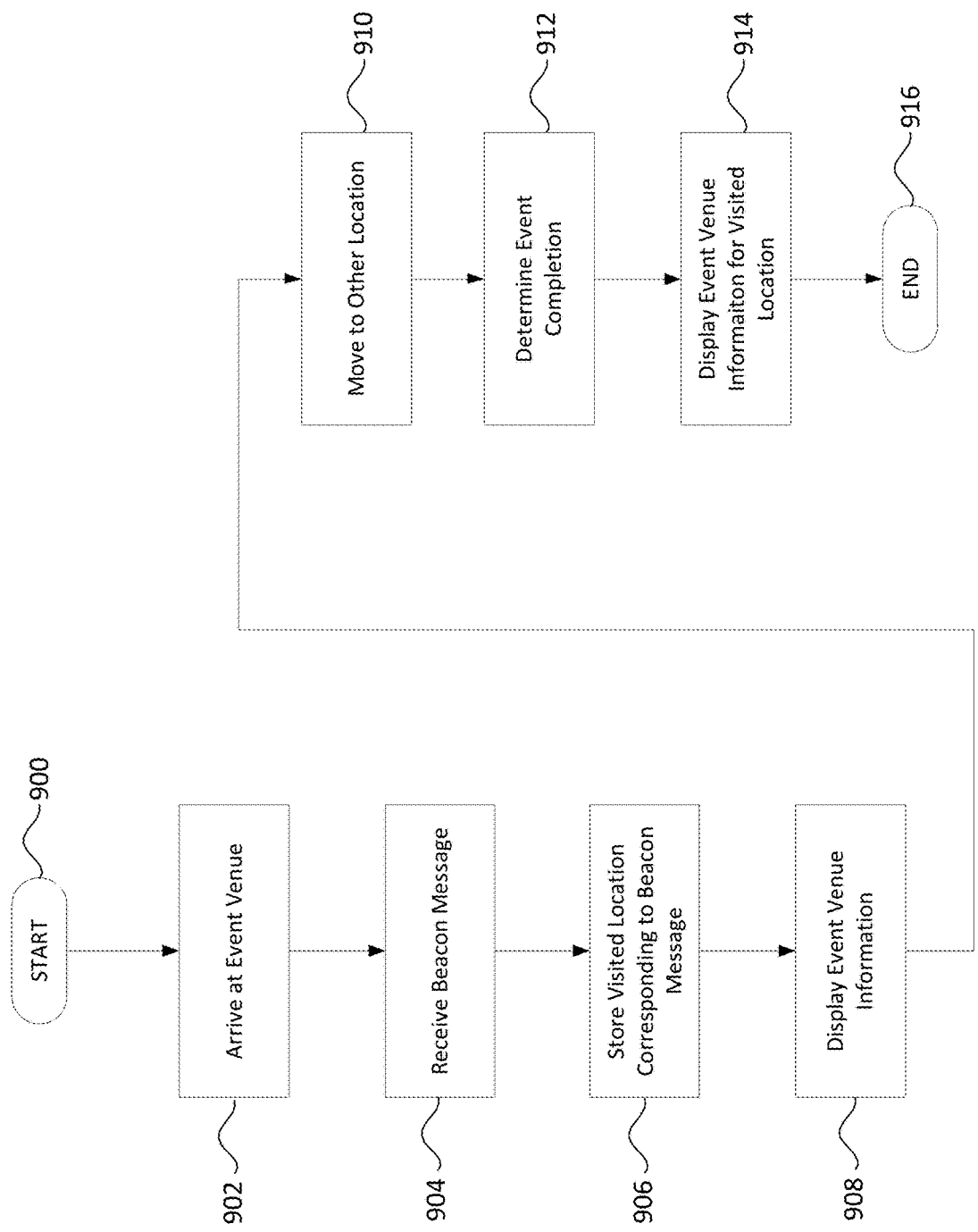
FIG. 9 is a flowchart showing a process for wayfinding at an event venue according to some embodiments of the present disclosure.

FIG. 9 is a flowchart showing a process for providing event venue information at an event venue according to some embodiments of the present disclosure. The process of this figure may be used in particular for defining a visited location and using that visited location as part of providing event venue information at an event venue. The process starts at step 900.

At step 902, arrival at an event venue is performed. Arrival at the event venue may include a mobile electronic device arriving at an event venue. Arrival at the event venue may include a mobile electronic device arriving at an event venue for which the mobile electronic device has already received and stored beacon information.

At step 904, beacon messages are received. Receiving beacon messages may include receiving beacon messages at the mobile electronic device from a beacon device provided at the event venue.

At step 906, a visited location is stored corresponding to the received beacon messages. Storing a visited location may include storing visited location information on the mobile electronic device. Storing a visited location may be based on processing beacon identification information provided in the beacon messages, comparing the beacon identification information to the beacon information stored on the mobile electronic device, and thereby determining a location at the event venue where the mobile electronic device is located. Storing a visited location may include storing a venue-specific location value corresponding to the location where the mobile electronic device is determined to be located. Storing a visited location may include storing a visited location as indicated by the very first beacon message received at the event venue. Storing a visited location may include storing a visited location as indicated by a beacon message received at the event venue, where the beacon message is associated with a transit location (such as indicated by the beacon information stored on the mobile electronic device). Storing a visited location may include storing a visited location as indicated by a beacon message received at the event venue, where the beacon message is a first beacon message received as associated with a transit location (such as indicated by the beacon information stored on the mobile electronic device). Other factors may be used to determine when to store a visited location as part of this step after having received beacon messages as part of the prior step.

At step 908, event venue information is displayed. This may include displaying information in an adaptive dashboard. This may include displaying wayfinding information. Displaying wayfinding information may include displaying information to a user of the electronic device that assists in the user arriving at some location at the event venue. Displaying wayfinding information may include displaying information to a user of the electronic device that assists in the user arriving at some predefined location at the event venue. Displaying wayfinding information may include displaying information to a user of the electronic device that assists in the user arriving at some entry point location at the event venue. Displaying wayfinding information may include any other form of wayfinding information display as discussed elsewhere in the present disclosure.

At step 910, movement to another location is performed. Moving to another location may include the mobile electronic device and its user moving to another location at the event venue. Moving to another location may include the mobile electronic device and its user moving to a location at the event venue where the user can experience the event occurring at the event venue.

At step 912, event completion is determined. Determining event completion may include determining that an event taking place at the event venue has completed. Determining event completion may include receiving an input from the user of the mobile electronic device indicating that the event has completed. Determining event completion may include receiving an input from a server or other computing device indicating that the event has completed.

At step 914, event venue information for the visited location is displayed. This may include displaying information in an adaptive dashboard. This may include displaying wayfinding information. Displaying wayfinding information for the visited location may include displaying information to a user of the electronic device that assists in the user arriving at the visited location. Displaying wayfinding information for the visited location may include displaying a route from the present location of the mobile electronic device, as determined by recently received beacon messages, to the venue-specific location previously stored as the visited location. Displaying wayfinding information for the visited location may include displaying a map of the event venue, displaying an indicator of the user's present location on the map, and displaying an indicator of the visited location on the map.

The process ends at step 916. Using the process of the present figure, a mobile electronic device may be able to assist the user in returning to some location previously visited. This may be advantageous in assisting the user in finding a parking lot, train station, or other exit location for the event venue that the user also used for entry to the event venue.

Figure 10:
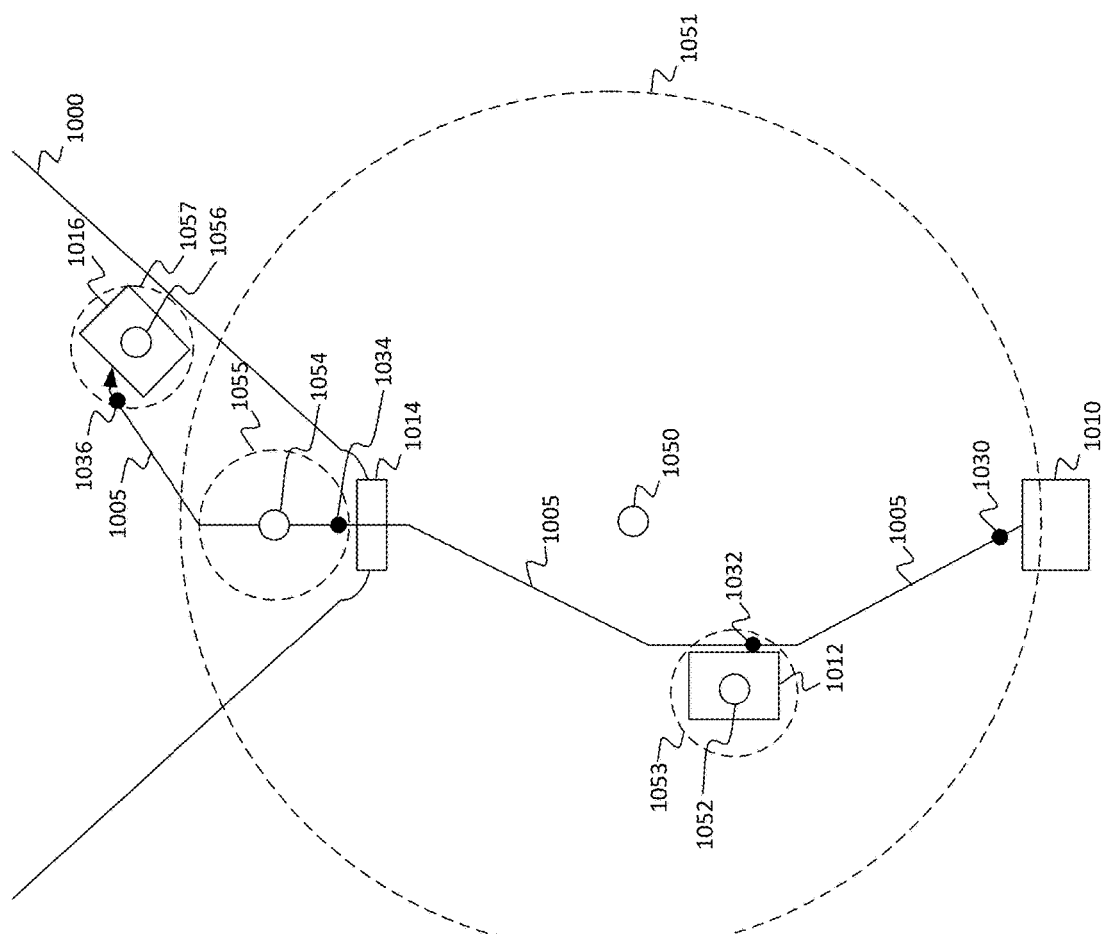
FIG. 10 is a block diagram showing an exemplary implementation of a system at an event venue according to some embodiments of the present disclosure.

FIG. 10 is a block diagram showing an exemplary implementation of a system at an event venue according to some embodiments of the present disclosure. FIG. 10 illustrates various exemplary implementations of techniques and features described elsewhere in the present disclosure.

FIG. 10 shows a ballpark 1000, a pedestrian entrance 1010, a point of interest 1012, a point of entry gate 1014, and a retail store 1016. Beacon devices 1050, 1052, 1054, and 1056 are shown, with beacon devices ranges 1051, 1053, 1055, and 1057, respectively. A user path of travel 1005 is also shown. Points 1030, 1032, 1034, and 1036 on user path of travel 1005 are also shown. The user travels along user path of travel 1005 as now described.

Figure 11:
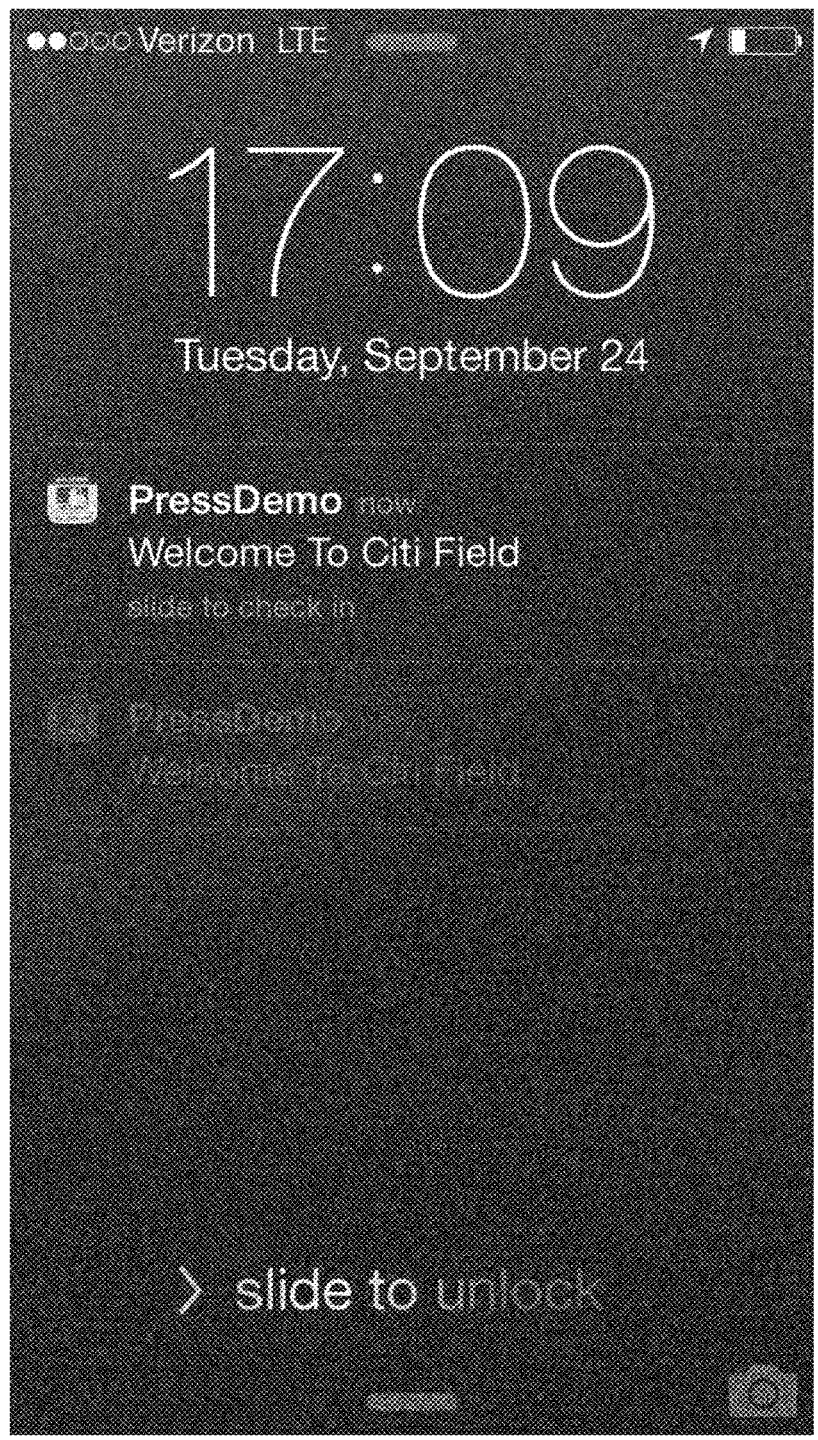
FIG. 11 shows an exemplary user interface for a notification message according to some embodiments of the present disclosure.
Figure 12:
FIG. 12 shows an exemplary user interface for a greeter screen according to some embodiments of the present disclosure.
Figure 13:
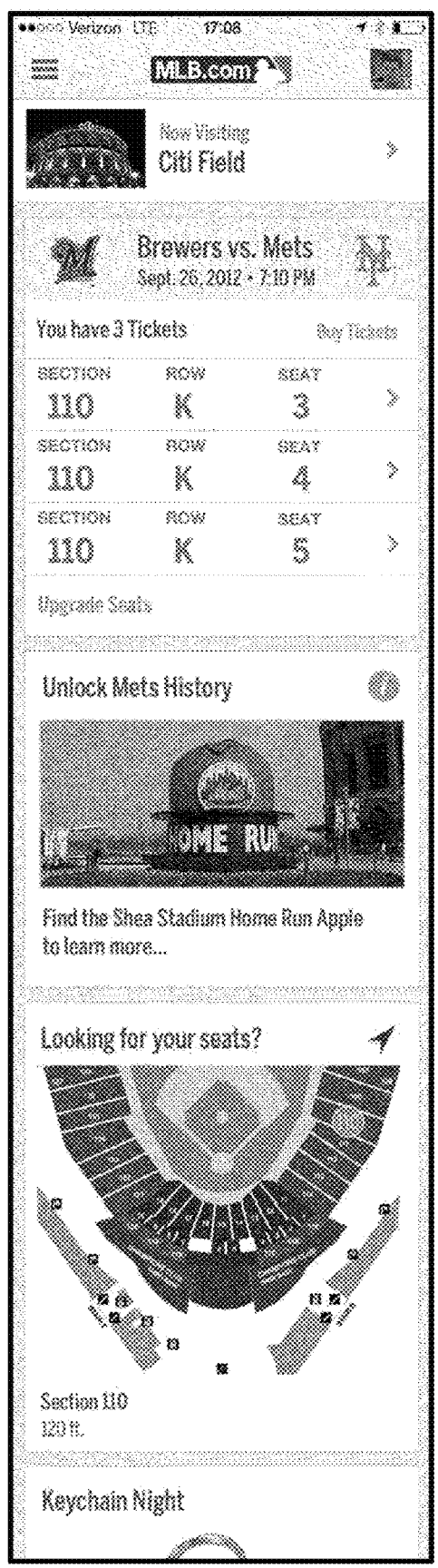
FIG. 13 shows an exemplary user interface for an adaptive user dashboard according to some embodiments of the present disclosure.

First, the user passes through pedestrian entrance 1010. Pedestrian entrance 1010 may be a station for a public transit system. At point 1030, the user's mobile device detects a beacon message received from beacon device 1050 due to being in beacon device range 1051. Based on processing the beacon message, the mobile device may send a notification to the user, such as displaying a text box on the screen of the mobile device and causing an audible or haptic signal. An exemplary user interface with a notification is shown in FIG. 11. The user may tap the notification on the screen of the mobile device. As a result of the user tapping the notification, the mobile device may launch a greeter screen, such as a screen that provides a welcome message to the user for the event venue. An exemplary user interface with a greeter screen is shown in FIG. 12. After dismissing or otherwise closing the greeter screen, the user may be presented with an adaptive dashboard on the screen of the mobile device. The adaptive dashboard may present information relevant to the user being located on the exterior of ballpark 1000, determined based on the identification information received in the beacon message from beacon device 1050. An exemplary user interface with an adaptive dashboard showing information relevant to the exterior of the stadium is shown in FIG. 13. The adaptive dashboard may prompt the user to visit point of interest 1012.

Next, the user walks along user path of travel 1005 towards point of interest 1012. Point of interest 1012 may be a statue of historical significance and relation to ballpark 1000. At point 1032, the user's mobile device detects a beacon message received from beacon device 1052 due to being in beacon device range 1053. Based on processing the beacon message, the mobile device may present the user with special unlocked content, such as a video of a baseball player batting a ball that then strikes point of interest 1012 while located in a prior location inside the stadium.

Figure 14:
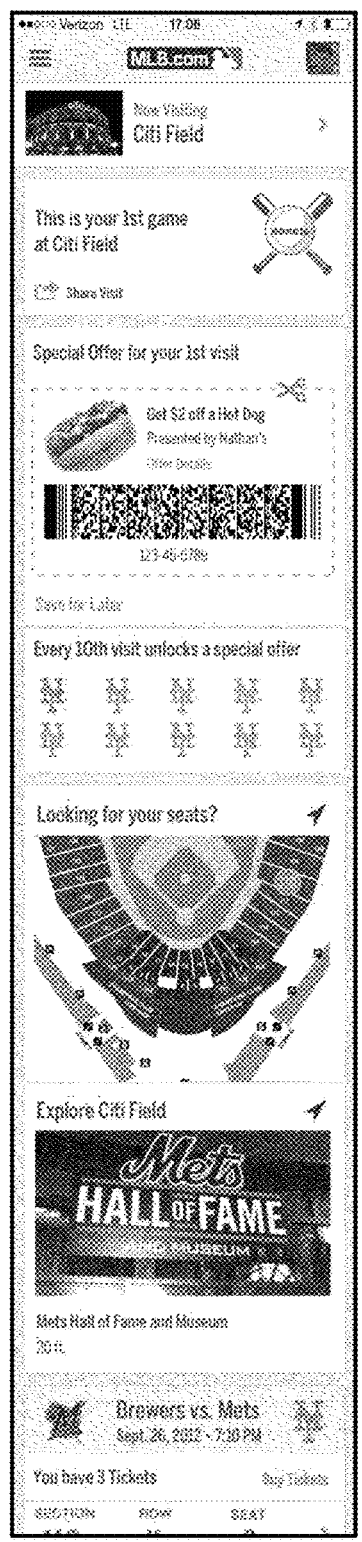
FIG. 14 shows an exemplary user interface for an adaptive user dashboard according to some embodiments of the present disclosure.

Next, the user walks along user path of travel 1005 and enters ballpark 1000 through point of entry gate 1014. At point 1034, the user's mobile device detects a beacon message received from beacon device 1054 due to being in beacon device range 1055. Based on processing the beacon message, the mobile device may present an adaptive dashboard with information relevant to the user being located on the interior of ballpark 1000, determined based on the identification information received in the beacon message from beacon device 1054. An exemplary user interface with an adaptive dashboard showing information relevant to the interior of the stadium is shown in FIG. 14.

Next, the user walks along user path of travel 1005 and approaches retail store 1016. At point 1036, the user's mobile device detects a beacon message received from beacon device 1056 due to being in beacon device range 1057. Based on processing the beacon message, the mobile device may present a coupon for purchase of merchandise sold at retail store 1016.

FIG. 11 shows an exemplary user interface for a notification message according to some embodiments of the present disclosure. As shown, a message prompting the user to launch a particular software application on the user device may be displayed.

FIG. 12 shows an exemplary user interface for a greeter screen according to some embodiments of the present disclosure. As shown, information as to an upcoming event that the user will be attending may be displayed.

FIG. 13 shows an exemplary user interface for an adaptive user dashboard according to some embodiments of the present disclosure. The ordering of information in the dashboard may be most relevant to a user located exterior to an event venue. Information as to admissions tickets may be presented first. Information as to a point of interest outside the event venue may be presented next. And information as to a map of the venue may be presented next. Other information may also be presented.

FIG. 14 shows an exemplary user interface for an adaptive user dashboard according to some embodiments of the present disclosure. The ordering of information in the dashboard may be most relevant to a user located interior to an event venue. Information as to a food coupon may be presented first. Information as to a tracking of a number of visits by the user to the event venue may be presented next. Information as to a map of the venue may be presented next. Information as to a point of interest inside the event venue may be presented next. Information as to admissions tickets may be presented next. Other information may also be presented.

Figure 15:
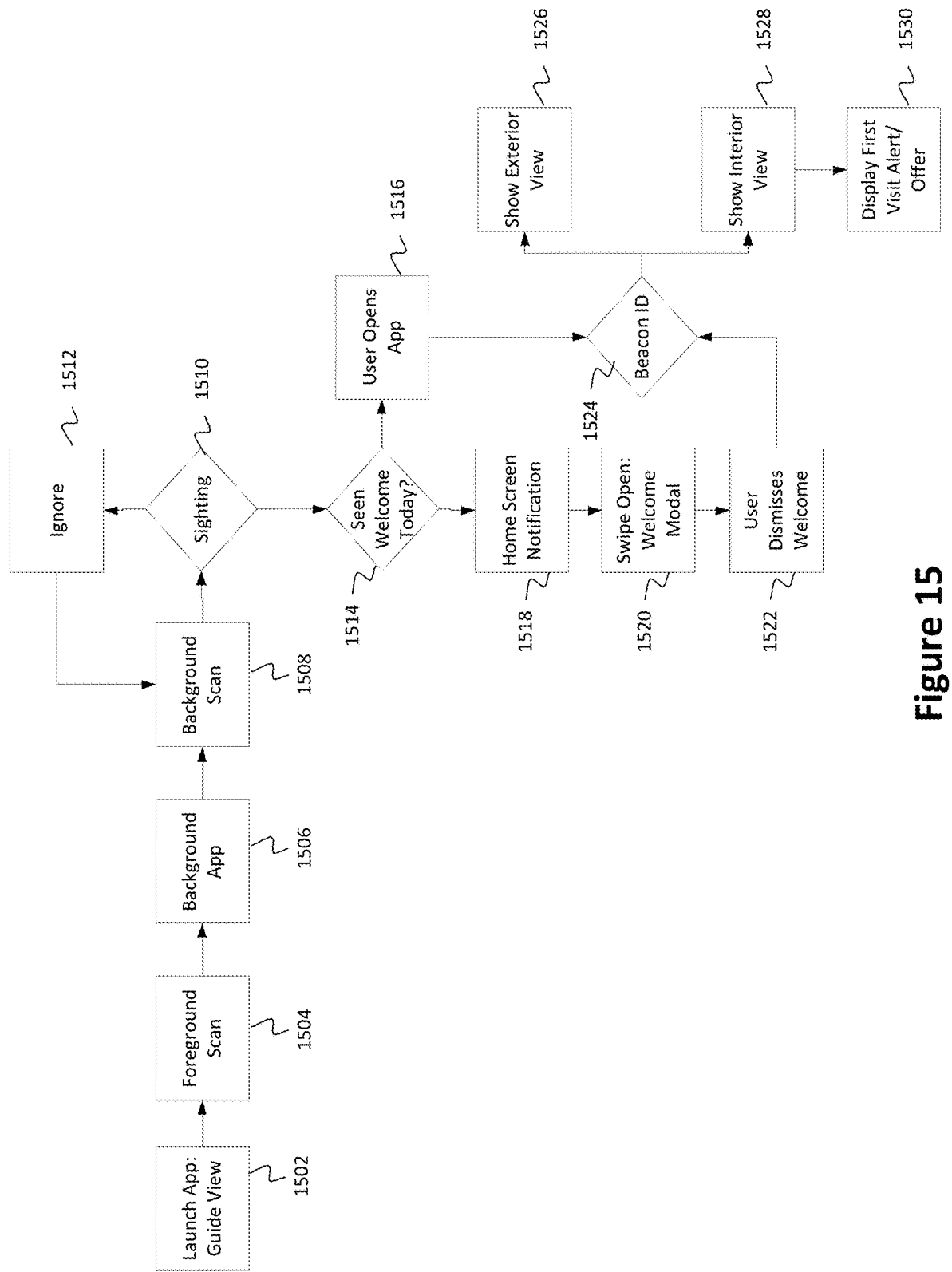
FIG. 15 is a flowchart showing an exemplary flow for presentation of information at an event venue according to some embodiments of the present disclosure.

FIG. 15 is a flowchart showing an exemplary flow for presentation of information at an event venue according to some embodiments of the present disclosure.

The flow begins at step 1502. At step 1502 an application is launched into a guide view. In the guide view, the application may present information about a particular event venue. The flow continues at step 1504. At step 1504, foreground scanning for beacon messages is performed. The process continues at step 1506. At step 1506, the application is placed into a background mode on the mobile device. In some embodiments, it may not be necessary to place the application into a background mode. Instead the application may remain in a foreground mode with foreground scanning. The process continues at step 1508. At step 1508, background scanning for beacon messages is performed.

The flow continues at step 1510. At step 1510, a sighting is made. A sighting may be a reception and successful processing of a beacon message. The result of the sighting may be the identification of a beacon identifier that was contained in the beacon message. From step 1510, wither step 1512 or step 1514 can be performed. If the beacon identifier relates to some information that is not relevant to the user (e.g., special seating section for which user does not have tickets), then step 1512 of ignoring the sighting may be performed. At that point, background scanning in step 1506 continues.

If the beacon identifier relates to some information that is relevant to the user, then the flow continues at step 1514. At step 1514, a determination is made as to whether the user has seen the application's welcome message yet that same day. If the user has seen the welcome message already that same day, then no further notification may be given. Instead, the flow may continue at step 1516 where the user opens the application, leading to step 1524. If the user has not seen the welcome message already that same day, then the flow continues at step 1518, wherein a notification is transmitted to the home screen of the mobile device to alert the user. The flow then continues at step 1520, wherein a swipe or some other motion of the user may open the application with the greeting screen. The flow continues at step 1522, wherein the welcome and/or the greeting screen are dismissed and the flow continues to step 1524.

At step 1524, a determination is made as to whether the received beacon identifier identifies the user as being interior to the event venue or exterior to the event venue. If the user is exterior to the event venue, then the flow continues at step 1526 where an exterior view is shown on the mobile device. The exterior view may be an adaptive dashboard with information pertinent to a user exterior to an event venue being displayed first. If the user is interior to the event venue, then the flow continues at step 1528 where an interior view is shown on the mobile device. The interior view may be an adaptive dashboard with information pertinent to a user interior to an event venue being displayed first. The flow continues at step 1530. At step 1530, a first visit alert and/or offer may be presented to the user if this is the user's first visit to that particular event venue.

Figure 16:
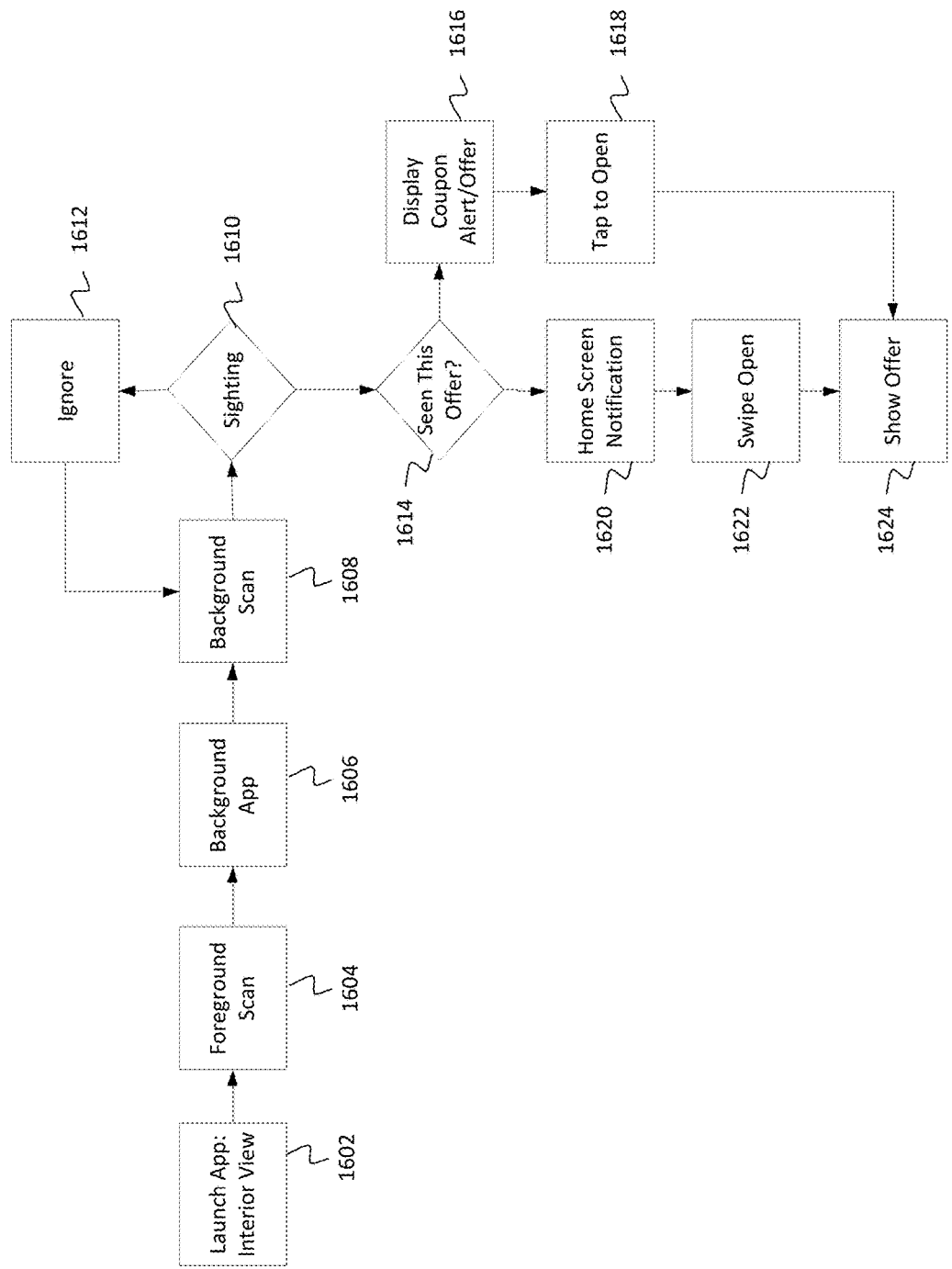
FIG. 16 is a flowchart showing an exemplary flow for presentation of information at an event venue according to some embodiments of the present disclosure.

FIG. 16 is a flowchart showing an exemplary flow for presentation of information at an event venue according to some embodiments of the present disclosure.

The flow begins at step 1602. At step 1602 an application is launched into a guide view. In the guide view, the application may present information about a particular event venue. The flow continues at step 1604. At step 1604, foreground scanning for beacon messages is performed. The process continues at step 1606. At step 1606, the application is placed into a background mode on the mobile device. In some embodiments, it may not be necessary to place the application into a background mode. Instead the application may remain in a foreground mode with foreground scanning. The process continues at step 1608. At step 1608, background scanning for beacon messages is performed.

The flow continues at step 1610. At step 1610, a sighting is made. A sighting may be a reception and successful processing of a beacon message. The result of the sighting may be the identification of a beacon identifier that was contained in the beacon message. From step 1610, wither step 1612 or step 1614 can be performed. If the beacon identifier relates to some information that is not relevant to the user (e.g., special seating section for which user does not have tickets), then step 1612 of ignoring the sighting may be performed. At that point, background scanning in step 1606 continues.

If the beacon identifier relates to some information that is relevant to the user, then the flow continues at step 1614. At step 1614, a determination is made as to whether the user has seen some offer related to the received beacon identifier. If the user has seen the offer already, then the coupon alert and/or offer may be presented in the adaptive dashboard the next time it is displayed at step 1616. The user may then tap the coupon alert and/or offer at step 1618, at which point the flow continues to step 1624. If the user has not seen the offer already, then the flow continues at step 1620, wherein a notification is transmitted to the home screen of the mobile device to alert the user. The flow then continues at step 1622, wherein a swipe or some other motion of the user may open the application, at which point the flow continues to step 1624. At step 1624, the offer is shown to the user. The offer may be a coupon for a retail store. The offer may be a coupon for a retail store based on the beacon identifier corresponding to a point of interest that the user was prompted to visit.

Figure 17:
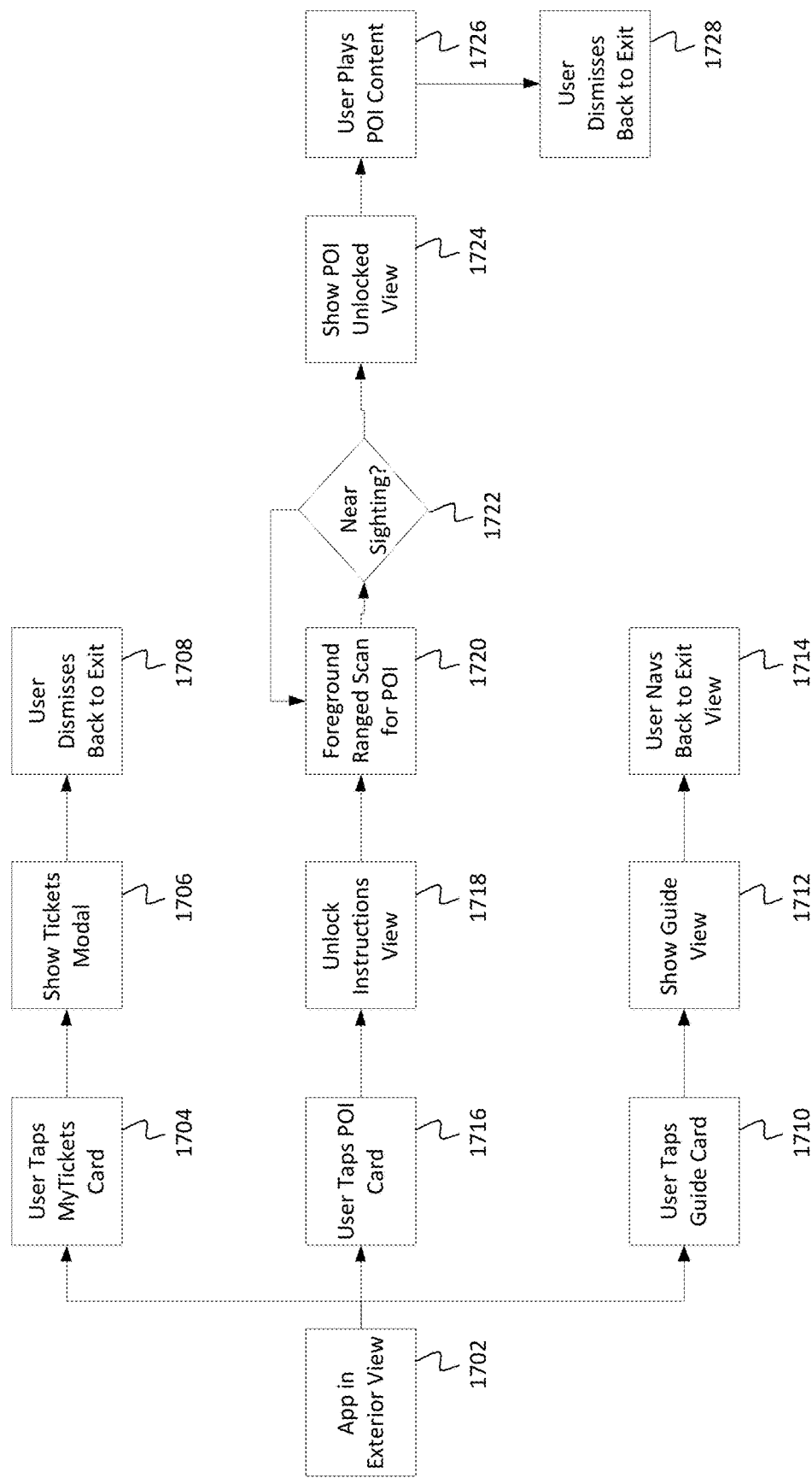
FIG. 17 is a flowchart showing an exemplary flow for presentation of information at an event venue according to some embodiments of the present disclosure.

FIG. 17 is a flowchart showing an exemplary flow for presentation of information at an event venue according to some embodiments of the present disclosure. The flow begins at step 1702. At step 1702, the application on the mobile device is running in an exterior view, so that the user may have been identified as being exterior to an event venue based on a received beacon message.

The flow may continue at step 1710. At step 1710, the user taps a guide card. The card may be a box or similar element displayed on a screen of the mobile device using the application. Based on the user tapping the guide card at step 1710, the application may show a guide for the event venue at step 1712. The guide may include a map of the event venue. The user may navigate back to the original exterior view at step 1714.

The flow may continue at step 1704. At step 1704, the user taps a tickets card. The card may be a box or similar element displayed on a screen of the mobile device using the application. Based on the user tapping the tickets card at step 1704, the application may show information corresponding to tickets that the user has purchased at step 1706. The tickets may be stored as digital tickets on the mobile device. The user may navigate back to the original exterior view at step 1708.

The flow may continue at step 1716. At step 1716, the user taps a point of interest card. The card may be a box or similar element displayed on a screen of the mobile device using the application. Based on the user tapping the point of interest card at step 1716, the application may show instructions prompting the user to visit a point of interest at the event venue at step 1718. After performing step 1718, the application may regularly performed foreground scans at step 1720 for beacon messages with beacon identifiers corresponding to the point of interest. At step 1722, a determination is made as to whether a sighting of the point of interest is made. If not, then the flow continues at step 1720. If so, the flow continues at step 1724. At step 1724, the an unlocked view for the point of interest is shown. The unlocked view may include content not previously available to the user prior to coming within range of the point of interest. At step 1726, the user may play the unlocked content related to the point of interest. The user may navigate back to the original exterior view at step 1728.

As discussed elsewhere in the present disclosure, embodiments of the present disclosure may use a short-range wireless communication technology in order to transmit beacon messages. Bluetooth, Bluetooth Low Energy, or a combination of the two may be used in some embodiments. A further description of some characteristics of the "short-range" communications that may be used with embodiments of the present disclosure is now presented. As discussed previously, the range of beacon devices is preferably limited so that the beacon device covers some particular venue-specific location (e.g., a particular seating section) but not considerable portions of others. In this way, each beacon device can be associated with some particular venue-specific location. As such, beacon identification information that identifies the particular beacon device is effective to indicate location in or near the particular associated venue-specific location. This aspect of the various exemplary discussions should highlight various characteristics of the communications described as "short-range" communications that differentiate over some other communications technologies known in the art.

Communications technologies that are only effective to a few inches or even a few feet would not be appropriate for the short-range communications technology of the present disclosure. For example, the use of near field communications ("NFC") would not be appropriate for the short-range communications technology of the present disclosure. Such technologies do not have a large enough range to be effective for the beacon devices. With such technologies, tens, hundreds, or even thousands of beacon devices would be necessary to provide coverage of a single venue-specific location. This would be an inefficient approach. For these reasons, embodiments of the present disclosure are designed to use a communications technology that has a range greater than only a few inches or a few feet.

Communications technologies that are effective at several hundreds of yards or even several miles would not be appropriate for the short-range communications technology of the present disclosure. For example, the use of a cellular network or WiMAX with effective ranges of several hundreds of yards or several miles would not be appropriate for the short-range communications technology of the present disclosure. Such technologies have too large of a range to cover only a single venue-specific location. If such technologies were used, they would cover numerous or even all venue-specific locations at the event venue, which would thereby confound any attempt to determine an approximate location of a mobile electronic device based on beacon messages from such beacon devices. For these reasons, embodiments of the present disclosure are designed to use a communications technology that has a range less than several hundreds of yards or several miles.

Communications technologies that are effective to a range of tens of yards may be preferred for the short-range communications technology of the present disclosure. For example, the use of Bluetooth, Bluetooth Low Energy, and Zigbee may be appropriate for the short-range communications technology of the present disclosure. Such communications technologies are often provided for the forming of personal area networks ("PANs"). If such technologies were used for a beacon device, the range of the beacon device would likely only cover a single venue-specific location or even a portion of a single venue-specific location. However, the range of such beacon devices would not be so small that hundreds of the beacon devices would be needed to cover a single venue-specific location. For these reasons, embodiments of the present disclosure may operate effectively using a communications technology that has a range of tens of yards.

Communications technologies including 802.11 WiFi technologies may not be preferable in some embodiments of the present disclosure. Such communications technologies are often provided for the forming of local area networks ("LANs"), often referred to more specifically as wireless local area networks ("WLANs"). WiFi technologies may be configured to have effective ranges similar to the preferable communications technologies described above. However, under standard configurations, WiFi technologies typically have ranges larger than those of the preferable communications technologies described above. For example, 802.11g may have a common range of 75 yards indoors and 275 yards outdoors. This may be larger than desired in some embodiments as described with respect to long-range communications technologies above.

In addition, the use of WiFi technologies may not be preferable in some embodiments of the present disclosure due to networking and connection characteristics of those WiFi technologies. Such WiFi technologies may require persistent connections, Internet Protocol ("IP") implementation, and other communications overhead that may introduce delays and errors in the wayfinding process. In contrast to these characteristics of many WLAN technologies, many of the PAN technologies described above are provided with simpler and lower overhead communications that may be allow the wayfinding process to execute more quickly and with less frequent communications errors. In addition, many of the PAN technologies are provided to consume less energy on the implementing device than the LAN technologies. In this way, the beacon device may be provided as a battery operated node, such as a coin-sized BLE beacon node. This may allow greater ease and flexibility in the deployment of the system and reduced ongoing maintenance costs. BLE may not require stable or high-bandwidth connectivity between the devices, effectively reducing the various hardware, power, and inconvenience costs associated with establishing and maintaining connections. BLE uses high advertising and transmit rates, which increases the likelihood of rapid interchange between the devices. BLE has channel isolation that reduces interference with WLAN systems that may be present in the same area. BLE minimizes battery usage for the user's mobile electronic device, making power available for other tasks. The use of BLE or other PAN technologies may benefit from keeping the exchange of data off of a shared IP network that may be used by WLANs in the same area. This may reduce latency and path loss. This may introduce fewer points of failure and vulnerability to penetration and exploitation. For the reasons just discussed, it may be preferable to use BLE or more generally PAN technologies instead of WiFi technologies in various embodiments of the present disclosure.

In embodiments where BLE is used, various factors of beacon devices may be relevant. Class 1 single-mode BLE beacons may be used. The beacon devices may transmit advertisements messages every 100 ms. The beacon devices may be designed so that transmission do not interfere with WiFi transmissions. "Retail" beacon devices may be used that have a camera mount, dedicated antenna, and use AA batteries. "Keyfob" beacon devices may be used that are clip-mounted and use a coin cell as an antenna. Other types of BLE beacon devices may be used in various other embodiments of the disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software embodied on a tangible medium, or combinations of both. To clearly illustrate this interchangeability of hardware and software, various illustrative components, blocks, modules, circuits, and steps have been described above generally in terms of their functionality. Whether such functionality is implemented as hardware or software embodied on a tangible medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more illustrative implementations, the functions described may be implemented in hardware, software or firmware embodied on a tangible medium, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

The invention claimed is:

1. A system for providing event venue information at an event venue, the system comprising:
   a plurality of beacon devices provided at the event venue, each beacon device of the plurality of beacon devices configured to transmit beacon identification information as part of a beacon message using short-range wireless communications,
   wherein the beacon identification information of the beacon message includes a unique beacon identifier that identifies which beacon device the beacon message was received from; and
   an event module provided on a mobile electronic device, wherein the event module is configured to process beacon messages received by the mobile electronic device in order to display event venue information to a user of the mobile electronic device,
   wherein the event module is configured to:
   process the beacon messages received by the mobile electronic device by comparing the unique beacon identifier included as part of the beacon messages to beacon information stored on the mobile electronic device to determine a location of the mobile electronic device, including whether the mobile electronic device is located within or external to the event venue;
   cause the mobile electronic device to display information pertaining to the determined location of the mobile electronic device.

2. The system of claim 1,
   wherein the short-range wireless communications comprises a personal area network communications technology.

3. The system of claim 1,
   wherein the short-range wireless communications comprises BLUETOOTH Low Energy communications.

4. The system of claim 1, further comprising:
   a server configured to transmit the beacon information to the mobile electronic device.

5. The system of claim 4,
   wherein the server is configured to transmit the beacon information to the mobile electronic device prior to the mobile electronic device being present at the event venue.

6. The system of claim 5,
   wherein the server is configured to transmit the beacon information to the mobile electronic device based on a determination that the mobile electronic device is likely to be present at the event venue in the future.

7. The system of claim 1,
   wherein at least one of the plurality of beacon devices is provided at one or more of the following locations: an entry point for the event venue; a parking facility for the event venue; a sales site at the event venue; a seating area at the event venue; a point of interest at the event venue; a guest facilities site at the event venue; and a navigation site at the event venue.

8. The system of claim 1,
   wherein the event venue information comprises direction information that indicates a route to travel in order to arrive at a predefined destination for the user.

9. The system of claim 8,
wherein the event module is configured to define the predefined destination based on an electronic ticket stored on the mobile electronic device.

10. The system of claim 1,
wherein the event module is configured to record a location where the mobile electronic device has been located based at least on beacon identification information included as part of at least one beacon message received by the mobile electronic device and the beacon information stored on the mobile electronic device, and
wherein the event venue information comprises direction information that indicates a route to travel from a present location of the mobile electronic device in order to arrive at the recorded location where the mobile electronic device has been located.

11. A method for providing event venue information at an event venue, the method comprising:
transmitting beacon messages using short-range wireless communications from a plurality of beacon devices provided at the event venue, wherein each beacon message comprises a unique beacon identifier identifying which beacon device the each beacon message was received from;
processing using an event module on a mobile electronic device beacon messages received by the mobile electronic device by comparing the unique beacon identifier included as part of the beacon messages to beacon information stored on the mobile electronic device to determine a location of the mobile electronic device, including whether the mobile electronic device is located within or external to the event venue; and
causing the mobile electronic device to display event information pertaining to the determined location of the mobile electronic device based on the processing of beacon messages received by the mobile electronic device.

12. The method of claim 11,
wherein the short-range wireless communications comprises a personal area network communications technology.

13. The method of claim 11,
wherein the short-range wireless communications comprises BLUETOOTH Low Energy communications.

14. The method of claim 11, further comprising:
transmitting the beacon information to the mobile electronic device from a server.

15. The method of claim 14,
wherein the server transmits the beacon information to the mobile electronic device prior to the mobile electronic device being present at the event venue.

16. The method of claim 15, further comprising:
determining using the server that the mobile electronic device is likely to be present at the event venue in the future,
wherein the server transmits the beacon information to the mobile electronic device based on the determining using the server that the mobile electronic device is likely to be present at the event venue in the future.

17. The method of claim 11,
wherein the beacon messages are transmitted by the plurality of beacon devices with at least one of the plurality of beacon devices provided at one or more of the following locations: an entry point for the event venue; a parking facility for the event venue; a sales site at the event venue; a seating area at the event venue; a point of interest at the event venue; a guest facilities site at the event venue; and a navigation site at the event venue.

18. The method of claim 11,
wherein the event venue information comprises direction information that indicates a route to travel in order to arrive at a predefined destination for the user.

19. The method of claim 18, further comprising:
defining using the event module the predefined destination based on an electronic ticket stored on the mobile electronic device.

20. The method of claim 11, further comprising:
recording using the event module a location where the mobile electronic device has been located based at least on beacon identification information included as part of at least one beacon message received by the mobile electronic device and the beacon information stored on the mobile electronic device,
wherein the event venue information comprises direction information that indicates a route to travel from a present location of the mobile electronic device in order to arrive at the recorded location where the mobile electronic device has been located.

* * * * *